United States Patent
Ishida et al.

(10) Patent No.: US 9,448,904 B2
(45) Date of Patent: Sep. 20, 2016

(54) INFORMATION PROCESSING APPARATUS AND SERVER MANAGEMENT METHOD

(71) Applicant: FUJITSU LIMITED, Kawasaki-shi, Kanagawa (JP)

(72) Inventors: Yousuke Ishida, Yokohama (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 469 days.

(21) Appl. No.: 14/049,750

(22) Filed: Oct. 9, 2013

(65) Prior Publication Data
US 2014/0189441 A1 Jul. 3, 2014

(30) Foreign Application Priority Data

Dec. 27, 2012 (JP) ................................. 2012-285314

(51) Int. Cl.
*G06F 11/30* (2006.01)
*G06F 9/50* (2006.01)
*G06F 11/34* (2006.01)

(52) U.S. Cl.
CPC ......... *G06F 11/3006* (2013.01); *G06F 9/5027* (2013.01); *G06F 11/34* (2013.01)

(58) Field of Classification Search
CPC .. G06F 11/3006; G06F 11/34; G06F 9/5027; G06F 11/203; H04L 67/10
USPC ........ 702/181, 182; 709/201, 224; 714/4.11, 714/6.32, 47.3, 47, 48
See application file for complete search history.

(56) References Cited

U.S. PATENT DOCUMENTS

| | | | |
|---|---|---|---|
| 7,669,087 B1 | 2/2010 | Johnsen et al. | |
| 8,751,637 B2 * | 6/2014 | Okita | H04L 41/142 709/223 |
| 2010/0251039 A1 | 9/2010 | Hirohata et al. | |

FOREIGN PATENT DOCUMENTS

| | | |
|---|---|---|
| JP | 2008-276320 A | 11/2008 |
| JP | 2008-293103 | 12/2008 |
| JP | 2011-013822 | 1/2011 |
| WO | 2006/002659 A1 | 1/2006 |

OTHER PUBLICATIONS

Extended European Search Report dated Dec. 17, 2014 for corresponding European Patent Application No. 13190662.0, 6 pages.

(Continued)

*Primary Examiner* — John H Le
(74) *Attorney, Agent, or Firm* — Fujitsu Patent Center

(57) ABSTRACT

An information processing apparatus includes an instruction unit and a calculation unit, and instructs a plurality of physical servers to start to provide or stop providing service. The calculation unit monitors the operating status of equipment that is installed in each of a plurality of chassis each housing one or a plurality of physical servers and that is used for operations of the physical servers. Then, the calculation unit calculates an equipment error probability indicating how likely the physical servers housed in a chassis are to fail to provide service due to an error in the equipment of the chassis. The instruction unit instructs physical servers to start to provide or stop providing the service, based on the equipment error probabilities of the plurality of chassis.

9 Claims, 29 Drawing Sheets

(56) References Cited

OTHER PUBLICATIONS

Japanese Office Action mailed Jun. 14, 2016 for corresponding Japanese Patent Application No. 2012-285314, with Partial English Translation, 8 pages.
Hideki, Imai et al., "Instrumentation and computerization technology for new era. Feasibility study. Utilization viewpoint and role of instrumentation and computerization technology. DCS secular change diagnosis and trouble prediction", Instrumentation Control Engineering, Kogyogijutsusha, Jan. 1, 2000, vol. 43, Issue 1, pp. 37-41, cited in Japanese Office Action mailed Jun. 14, 2016 for corresponding Japanese Application No. 2012-285314, with English Abstract.

* cited by examiner

T1 CHASSIS INFORMATION TABLE

| ID | CHASSIS NAME | PAIR ID | AGE | CHASSIS TWO-SIDED ERROR PROBABILITY | MIGRATION DESTINATION CHASSIS PRIORITY |
|---|---|---|---|---|---|
| 1 | chassia1 | 1 | 3 | 17 | 2 |
| 2 | chassia2 | 2 | 3 | 0 | 1 |

FIG. 11

T2 MANAGEMENT BLADE INFORMATION TABLE

| ID | CHASSIS ID | MANAGEMENT BLADE NAME | PAIR ID | OPERATING STATUS | VOLTAGE | AGE | OPERATING DAY COUNT | TWO-SIDED ERROR PROBABILITY |
|---|---|---|---|---|---|---|---|---|
| 1 | 1 | chassia1-1 | 1 | normal | 20 | 3 | 300 | 50 |
| 2 | 1 | chassia1-2 | 1 | error | 5 | 12 | 4335 | 50 |
| 3 | 2 | chassia2-1 | 2 | normal | 20 | 5 | 35 | 0 |
| 4 | 2 | chassia2-2 | 2 | normal | 25 | 9 | 63 | 0 |

FIG. 12

T3 CONNECTION BLADE INFORMATION TABLE

| ID | CHASSIS ID | SLOT ID | CONNECTION BLADE NAME | PAIR ID | OPERATING STATUS | VOLTAGE | AGE | OPERATING DAY COUNT | TWO-SIDED ERROR PROBABILITY |
|---|---|---|---|---|---|---|---|---|---|
| 1 | 1 | 1 | chassia1-Lan1 | 1 | normal | 20 | 5 | 53 | 0 |
| 2 | 1 | 2 | chassia1-Lan2 | 1 | normal | 20 | 6 | 64 | 0 |
| 3 | 1 | 3 | chassia1-Lan3 | 2 | normal | 20 | 2 | 36 | 0 |
| 4 | 1 | 4 | chassia1-Lan4 | 2 | normal | 20 | 4 | 54 | 0 |
| 5 | 2 | 1 | chassia2-Lan1 | 3 | normal | 20 | 5 | 73 | 0 |
| 6 | 2 | 2 | chassia2-Lan2 | 3 | normal | 20 | 7 | 62 | 0 |
| 7 | 2 | 3 | chassia2-Lan3 | 4 | normal | 20 | 8 | 43 | 0 |
| 8 | 2 | 4 | chassia2-Lan4 | 4 | normal | 20 | 7 | 56 | 0 |

FIG. 13

T4 CHASSIS THRESHOLD TABLE

| ID | ITEM | MINIMUM THRESHOLD | MAXIMUM THRESHOLD |
|---|---|---|---|
| 1 | AGE | 0 | 10 |

FIG. 14

T5 MANAGEMENT BLADE THRESHOLD TABLE

| ID | ITEM | MINIMUM THRESHOLD | MAXIMUM THRESHOLD |
|---|---|---|---|
| 1 | VOLTAGE | 10 | 50 |
| 2 | AGE | 0 | 10 |
| 3 | OPERATING DAY COUNT | 0 | 500 |

FIG. 15

T6 CONNECTION BLADE THRESHOLD TABLE

| ID | ITEM | MINIMUM THRESHOLD | MAXIMUM THRESHOLD |
|---|---|---|---|
| 1 | VOLTAGE | 10 | 50 |
| 2 | AGE | 0 | 10 |
| 3 | OPERATING DAY COUNT | 0 | 500 |

FIG. 16

T7  TWO-SIDED ERROR PROBABILITY THRESHOLD TABLE

| ID | TYPE | PAIR ID | MAXIMUM THRESHOLD | |
|---|---|---|---|---|
| 1 | MANAGEMENT BLADE | 1 | 50 | FIRST THRESHOLD |
| 2 | MANAGEMENT BLADE | 2 | 50 | |
| 3 | CONNECTION BLADE | 1 | 50 | SECOND THRESHOLD |
| 4 | CONNECTION BLADE | 2 | 50 | |
| 5 | CONNECTION BLADE | 3 | 50 | |
| 6 | CONNECTION BLADE | 4 | 50 | |
| 7 | CHASSIS | — | 50 | THIRD THRESHOLD |
| 8 | CHASSIS | — | 50 | |

FIG. 17

T8  PHYSICAL SERVER INFORMATION TABLE

| ID | CHASSIS ID | CPU(MHz) | MEMORY (MB) | IP ADDRESS |
|----|------------|----------|-------------|------------|
| 1  | 1          | 2000     | 4000        |            |
| 2  | 1          | 2000     | 4000        |            |
| 3  | 2          | 2000     | 4000        |            |
| 4  | 2          | 2000     | 4000        |            |

FIG. 18

T9 VM HOST INFORMATION TABLE

| ID | PHYSICAL SERVER ID | CPU CONSUMPTION (MHz) | CPU CONSUMPTION RANKING | MEMORY CONSUMPTION (MB) | MEMORY CONSUMPTION RANKING | MIGRATION DESTINATION INDEX | THRESHOLD-EXCEEDED FLAG |
|---|---|---|---|---|---|---|---|
| 1 | 1 | 1800 | 1 | 3000 | 1 | 2 | true |
| 2 | 2 | 100 | 2 | 200 | 2 | 4 | true |
| 3 | 3 | 100 | 2 | 200 | 2 | 4 | false |
| 4 | 4 | 100 | 2 | 200 | 2 | 4 | false |

FIG. 19

T10 VM GUEST INFORMATION TABLE

| ID | VM HOST ID | CPU CONSUMPTION (MHz) | MEMORY CONSUMPTION (GB) |
|---|---|---|---|
| 1 | 1 | 1000 | 2000 |
| 2 | 1 | 800 | 1000 |

FIG. 20

INFORMATION PROCESSING APPARATUS AND SERVER MANAGEMENT METHOD

CROSS-REFERENCE TO RELATED APPLICATION

This application is based upon and claims the benefit of priority of the prior Japanese Patent Application No. 2012-285314, filed on Dec. 27, 2012, the entire contents of which are incorporated herein by reference.

FIELD

The embodiments discussed herein relate to an information processing apparatus and a server management method.

BACKGROUND

Physical servers are able to provide service to users. For example, in response to a user request from a terminal device over a network, a physical server operates at the request. Such service provision is realized by using, for example, virtual machines.

Virtual machines (VMs) are virtual computers that are created by virtualizing resources such as Central Processing Units (CPUs) and storage devices of physical servers.

Virtualization of computer resources enables a plurality of virtual machines with different Operating Systems (OSes) and software to run on a single physical server simultaneously, which leads to efficient use of the physical server.

In addition, such a server system employs a technique (live migration) of placing a virtual machine on another physical server without stopping service provided by the virtual machine. Placing the virtual machine causes the physical server to run the virtual machine. Appropriate virtual machine placement enables power saving and load balancing in the system.

For example, power saving is realized by placing virtual machines on specified physical servers according to variations in the loads on the CPUs and memories of the physical servers and suspending physical servers where no virtual machines are located (Distributed Power Management (DPM)). On the other hand, load balancing is realized by migrating virtual machines from a physical server with a high load to a physical server with a low load (Distributed Resource Scheduling (DRS)).

In relation to virtual machine placement, there has been proposed a technique of selecting a physical server that satisfies constraint conditions for placing virtual machines and has the highest priority. There has also been proposed a technique of calculating the reliability characteristics of a virtual system in which virtual devices are located on physical devices, on the basis of system configuration information indicating a correspondence between the virtual devices and the physical devices.

Please see, for example, Japanese Laid-open Patent Publications Nos. 2011-13822 and 2008-293103.

In determining the location of a virtual machine, i.e., determining which one of chassis housing physical servers and which physical server of the chassis the virtual machine is to be placed on, a conventional technique is to select a physical server with a relatively low load with the consideration of the loads on the CPUs and memories of the physical servers and place the virtual machine thereon.

However, if an error such as power interruption, disconnection of server communications, etc. occurs in a chassis where a virtual machine is located, there arises a problem in which the virtual machine stops its execution and therefore the server system stops, which reduces availability (sustainability of operations). Moreover, if such an error occurs in the chassis, not only service provided using the virtual machine but also service provided by physical servers housed in the chassis stops, which reduces the availability.

SUMMARY

According to one embodiment, there is provided an information processing apparatus. This information processing apparatus includes a processor configured to perform a procedure including: monitoring an operating status of equipment that is installed in each of a plurality of chassis each housing one or a plurality of physical servers and that is used for the operations of the physical servers, and calculating an equipment error probability of each of the plurality of chassis, the equipment error probability indicating how likely the physical servers housed in the chassis are to fail to provide service due to an error in the equipment of the chassis; and instructing the physical servers to start to provide or stop providing the service, based on calculated equipment error probabilities of the plurality of chassis.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an exemplary structure of a chassis information table;

FIG. 12 illustrates an exemplary structure of a management blade information table;

FIG. 13 illustrates an exemplary structure of a connection blade information table;

FIG. 14 illustrates an exemplary structure of a chassis threshold table;

FIG. 15 illustrates an exemplary structure of a management blade threshold table;

FIG. 16 illustrates an exemplary structure of a connection blade threshold table;

FIG. 17 illustrates an exemplary structure of a two-sided error probability threshold table;

FIG. 18 illustrates an exemplary structure of a physical server information table;

FIG. 19 illustrates an exemplary structure of a VM host information table;

FIG. 20 illustrates an exemplary structure of a VM guest information table;

DESCRIPTION OF EMBODIMENTS

Figure 1:
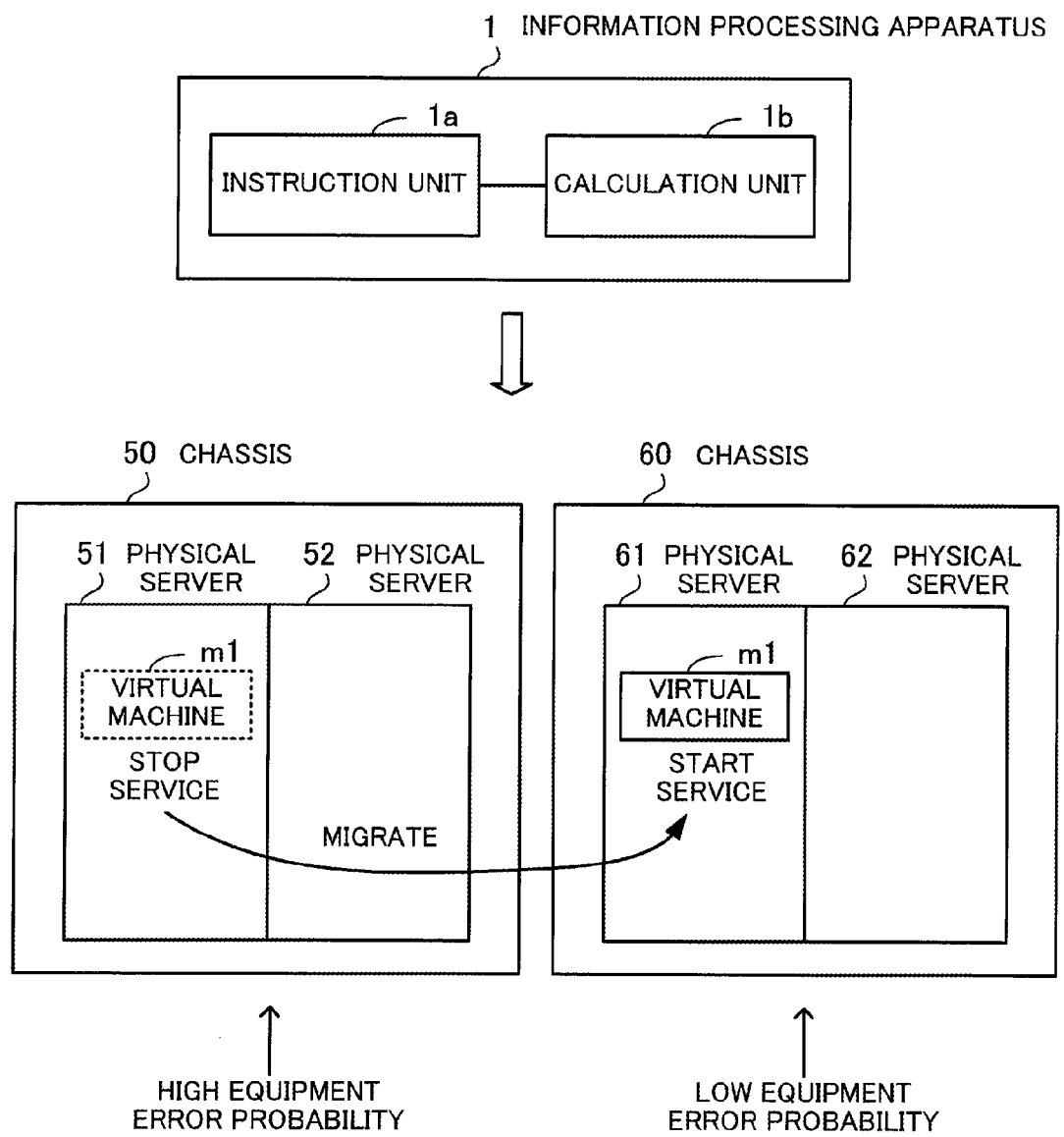
FIG. 1 illustrates an example of a configuration of an information processing apparatus.

Several embodiments will be described below with reference to the accompanying drawings, wherein like reference numerals refer to like elements throughout.

(a) First Embodiment

FIG. 1 illustrates an example of a configuration of an information processing apparatus. An information processing apparatus 1 includes an instruction unit 1a and a calculation unit 1b, and is configured to instruct a plurality of physical servers 51, 52, 61, and 62 having service providing functions to start to provide or stop providing service. In the example of FIG. 1, the physical servers 51, 52, 61, and 62 each provide service with a virtual machine.

The calculation unit 1b monitors the operating status of equipment that is installed in each of a plurality of chassis 50 and 60 each housing one or a plurality of physical servers and that is used for the operations of the physical servers. Then, the calculation unit 1b calculates an equipment error probability indicating how likely the physical servers 51, 52, 61, and 62 housed in a chassis 50 and 60 are to fail to provide service due to an error in the equipment of the chassis 50 and 60. The instruction unit 1a instructs physical servers determined based on the equipment error probabilities of the plurality of chassis 50 and 60 to start to provide or stop providing the service.

In this connection, the physical servers 51 and 52 are housed in the chassis 50, whereas the physical servers 61 and 62 are housed in the chassis 60. In addition, a virtual machine m1 is initially located on the physical server 51, and provides service to users.

Under this configuration, the calculation unit 1b calculates an equipment error probability with respect to the equipment of each chassis 50 and 60. It is now assumed that the equipment error probability of the chassis 50 is higher than that of the chassis 60.

In this case, the instruction unit 1a instructs the physical server 51 of the chassis 50 to stop providing the service. The instruction unit 1a also instructs the physical server 61 of the chassis 60 to start to provide the service which the physical server 51 has provided. In the case where the virtual machine m1 is used to provide the service, an instruction for migrating the virtual machine m1 may be issued in place of instructions for stopping providing and starting to provide the service. More specifically, the instruction unit 1a changes the location of the virtual machine m1 by migrating the virtual machine m1 from the chassis 50 to the physical server 61 of the chassis 60. In this connection, the instruction unit 1a may be configured to issue instructions to stop providing and start to provide service only when the equipment error probability of a chassis that houses a physical server providing the service exceeds a predetermined threshold.

As described above, the information processing apparatus 1 realizes optimal virtual machine placement on the basis of the error probabilities of chassis that are locations for a virtual machine. This suppresses a phenomenon in which a virtual machine stops its execution due to an error occurring in a chassis where the virtual machine is located and thereby the server system fails. As a result, it is possible to improve the availability and reliability of the system.

(b) Second Embodiment

The following describes a second embodiment which uses a blade server system to enable more precise control for optimal virtual machine placement.

Figure 2:
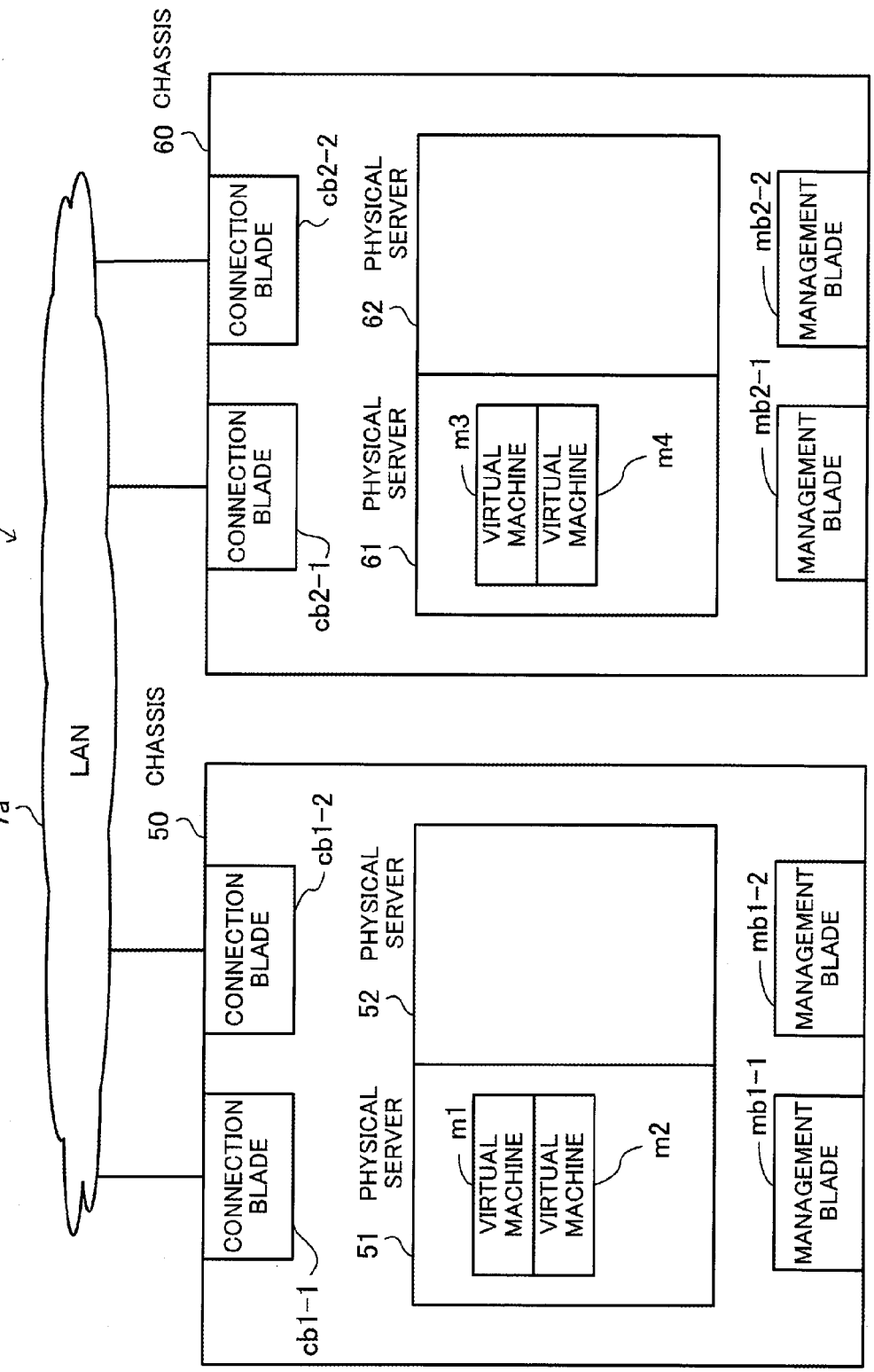
FIG. 2 illustrates an example of a configuration of a blade server system.

Now, problems to be solved by this technique will be described in detail. The following describes, in detail, an example in which the technique is applied to a blade server system. FIG. 2 illustrates an example of a configuration of a blade server system. A blade server is a server in which a plurality of physical servers called blades is installed in a chassis. In addition, virtual machines are placed on specified physical servers.

A blade server system 5a includes chassis 50 and 60 and a Local Area Network (LAN) 7a. The chassis 50 houses physical servers 51 and 52, management blades (MMB) mb1-1 and mb1-2, and connection blades (CB) cb1-1 and cb1-2. The management blades mb1-1 and mb1-2 and connection blades cb1-1 and cb1-2 are one example of equipment that is used for the operations of the physical servers 51 and 52.

On the other hand, the chassis 60 houses physical servers 61 and 62, management blades mb2-1 and mb2-2, and connection blades cb2-1 and cb2-2. The management blades mb2-1 and mb2-2 and connection blades cb2-1 and cb2-2 are one example of equipment that is used for the operations of the physical servers 61 and 62. The connection blades cb1-1, cb1-2, cb2-1, and cb2-2 connect to the LAN 7a, which is a communication network for management operation.

Each pair of the management blades mb1-1 and mb1-2 and the management blades mb2-1 and mb2-2 is in a redundant configuration having active/standby modes. Therefore, when the management blade mb1-1 operates in active mode, the other management blade mb1-2 operates in standby mode. Conversely, when the management blade mb1-2 operates in active mode, the other management blade mb1-1 operates in standby mode. The same applies to the management blades mb2-1 and mb2-2.

On the other hand, each pair of the connection blades cb1-1 and cb1-2 and the connection blades cb2-1 and cb2-2 is in a redundant configuration having active/active modes. Without distinction of active/standby modes, the connection blades, when connected, are all caused to operate in active mode. Paired connection blades operating in active mode perform load balancing between themselves. In this connection, in each pair of the connection blades cb1-1 and cb1-2 and the connection blades cb2-1 and cb2-2, one connection blade may be set to operate in active mode and the other connection blade may be set in standby mode.

FIG. 2 illustrates one pair of connection blades in a single chassis. However, n (=1, 2, 3, . . . ) pairs of connection blades may be installed (that is, 2n connection blades may be installed in a single chassis).

The management blades mb1-1 and mb1-2 are management units that manage and operate the physical servers 51 and 52 in the chassis 50, and also control power supply to the physical servers 51 and 52. Likewise, the management blades mb2-1 and mb2-2 are management units that manage and operate the physical servers 61 and 62 in the chassis 60, and also control power supply to the physical servers 61 and 62.

The connection blades cb1-1 and cb1-2 are connecting units that act as interfaces for local and remote communications by connecting the physical servers 51 and 52 to external devices via the LAN 7a. Likewise, the connection blades cb2-1 and cb2-2 are connecting units that act as interfaces for local and remote communications by connecting the physical servers 61 and 62 to external devices via the LAN 7a.

It is assumed that virtual machines m1 and m2 run on the physical server 51 in the chassis 50 and virtual machines m3 and m4 run on the physical server 61 in the chassis 60.

Figure 3:
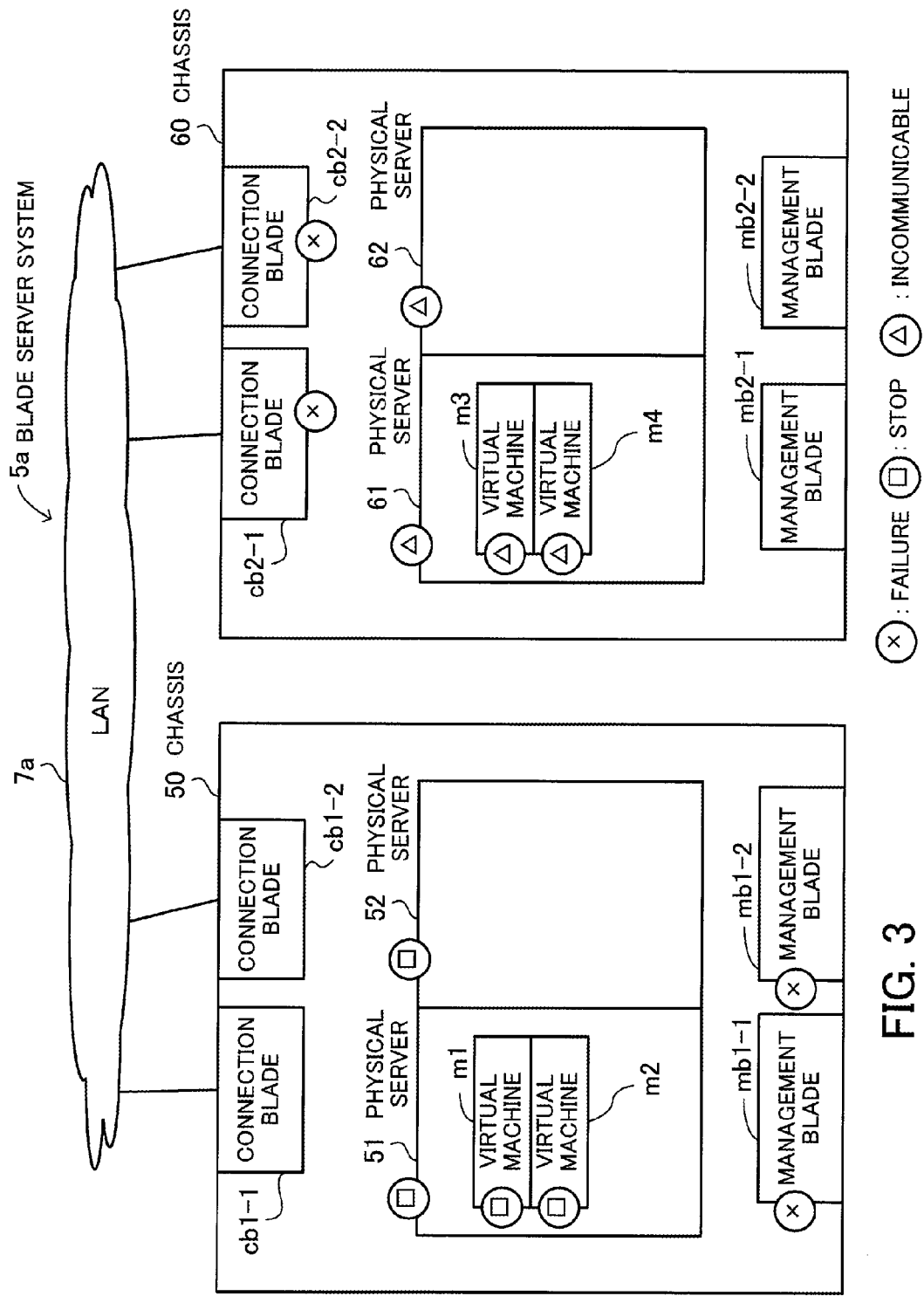
FIG. 3 illustrates the case where a two-sided error occurs in both pairs of management blades and connection blades.

FIG. 3 illustrates the case where a two-sided error occurs in both pairs of management blades and connection blades. The two-sided error is an error that occurs in both of paired units. For example, if a failure occurs in only the management blade mb1-1 of the management blades mb1-1 and mb1-2 in the chassis 50, the management blade mb1-2 in standby mode is activated, so that the operation continues.

However, when an error occurs in both of the management blades mb1-1 and mb1-2 each having a power supply function, the management blades mb1-1 and mb1-2 stop power supply to the physical servers 51 and 52 in the chassis 50. This results in stopping the operations of the virtual machines m1 and m2 running on the physical server 51.

On the other hand, when an error occurs in both of the connection blades cb2-1 and cb2-2 each having a communication interface function in the chassis 60, the communications of the physical servers 61 and 62 in the chassis 60 with outside are disconnected. As a result, the virtual machines m3 and m4 running on the physical server 61 fail to communicate with outside, and become incommunicable (unusable).

Figure 4:
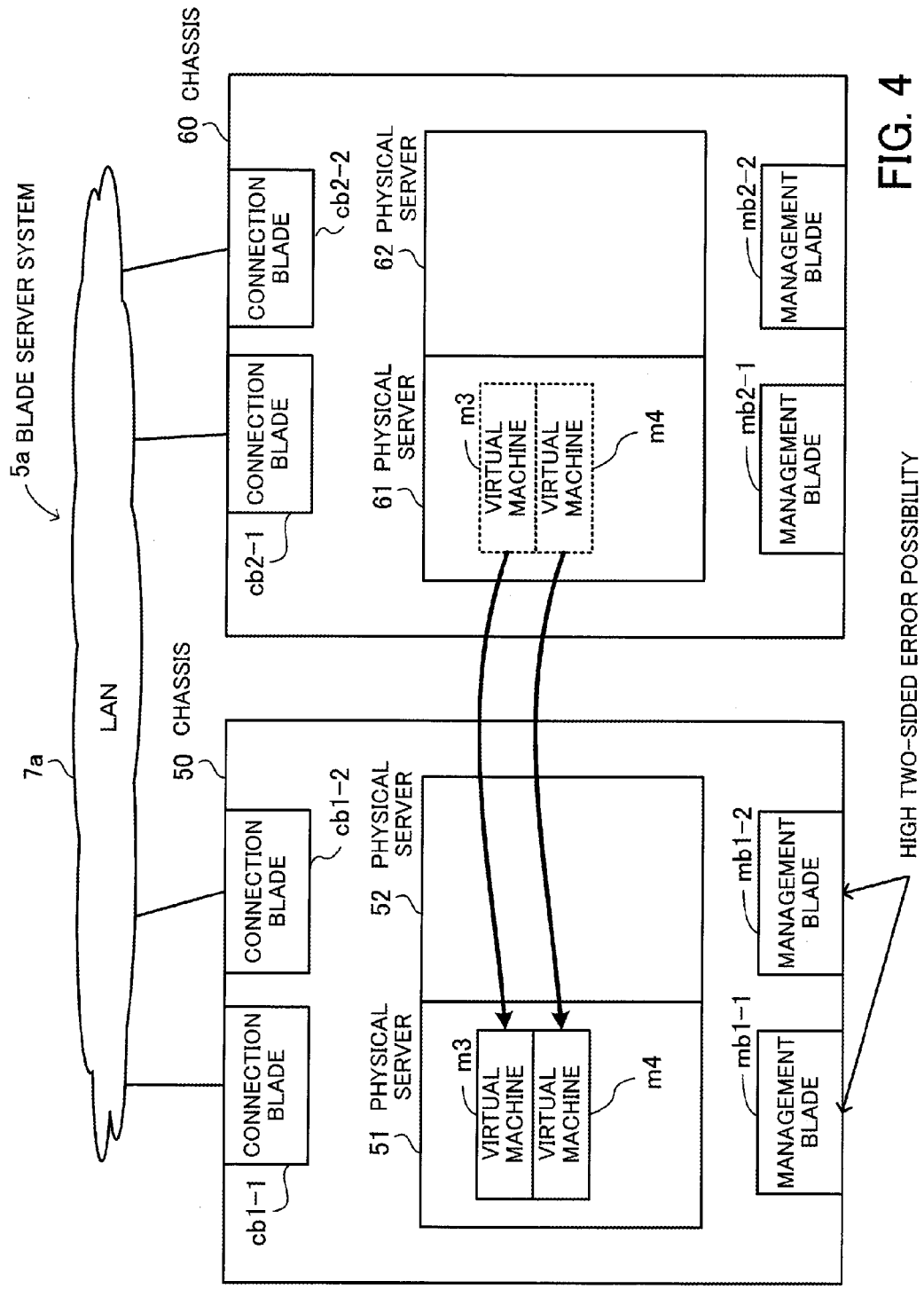
FIGS. 4 to and 7 illustrate problems that may arise at the time of placing virtual machines.
Figure 5:
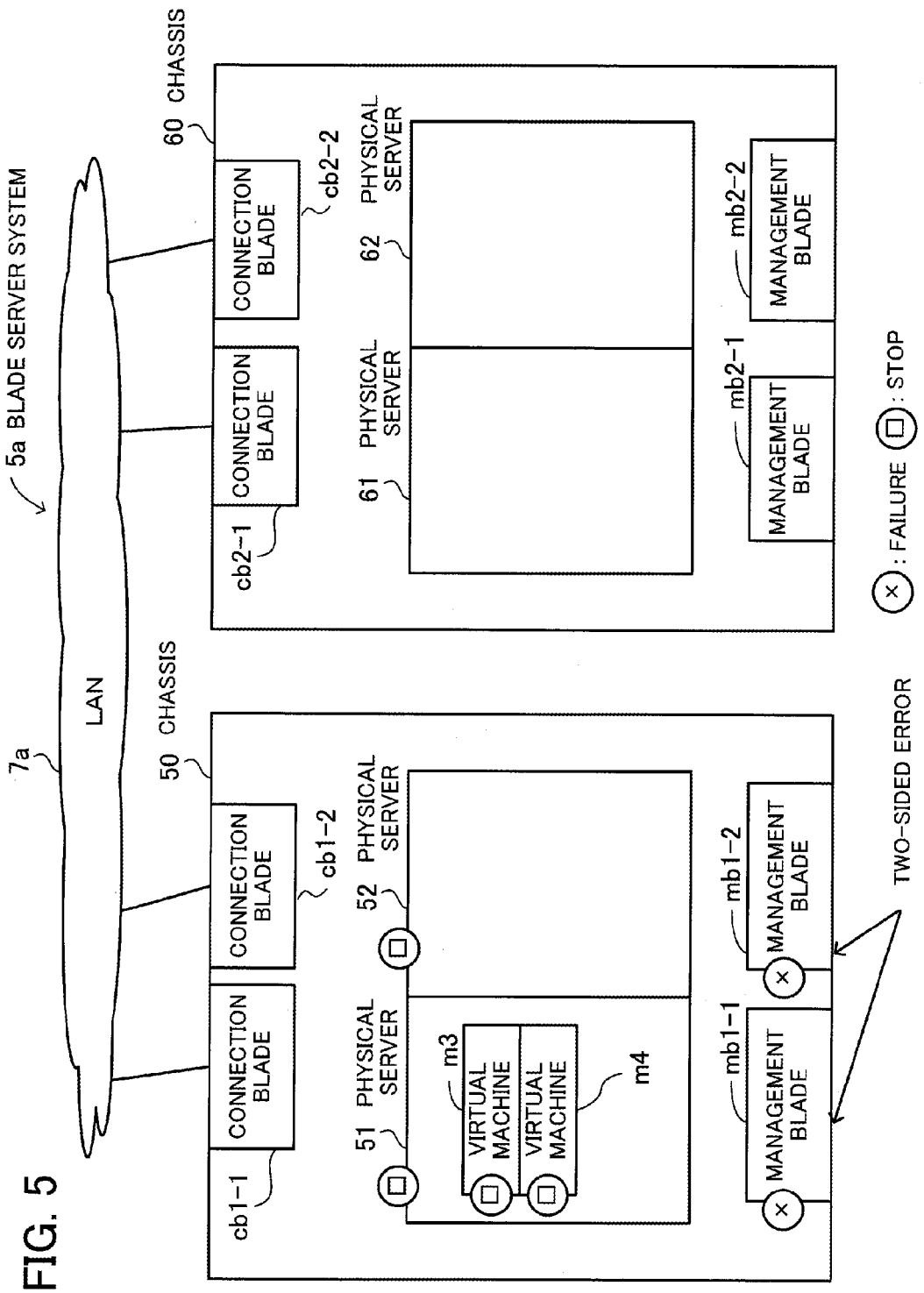

FIGS. 4 and 5 illustrate a problem that may arise at the time of placing virtual machines. In FIG. 4, it is assumed that a two-sided error is likely to occur in the management blades mb1-1 and mb1-2 in the chassis 50. It is also assumed that the virtual machines m3 and m4 are running on the physical server 61 in the chassis 60 and the CPU load and memory load continue to be high in the physical server 61.

In this case, in conventional control of virtual machine placement, if the load on the physical server 51 in the chassis 50 is lower than that on the physical server 61 and the physical server 51 has more free processing capacity than the physical server 61, the virtual machines m3 and m4 would be migrated to the physical server 51 in the chassis 50 for load balancing.

However, a two-sided error is likely to occur in the management blades mb1-1 and mb1-2. If a two-sided error actually occurs, as illustrated in FIG. 5, power supply to the physical servers 51 and 52 in the chassis 50 is interrupted.

If this happens, the virtual machines m3 and m4, which have been migrated from the physical server 61 to the physical server 51, stop their execution. This causes a system failure and thus reduces system availability and also reliability.

Figure 6:
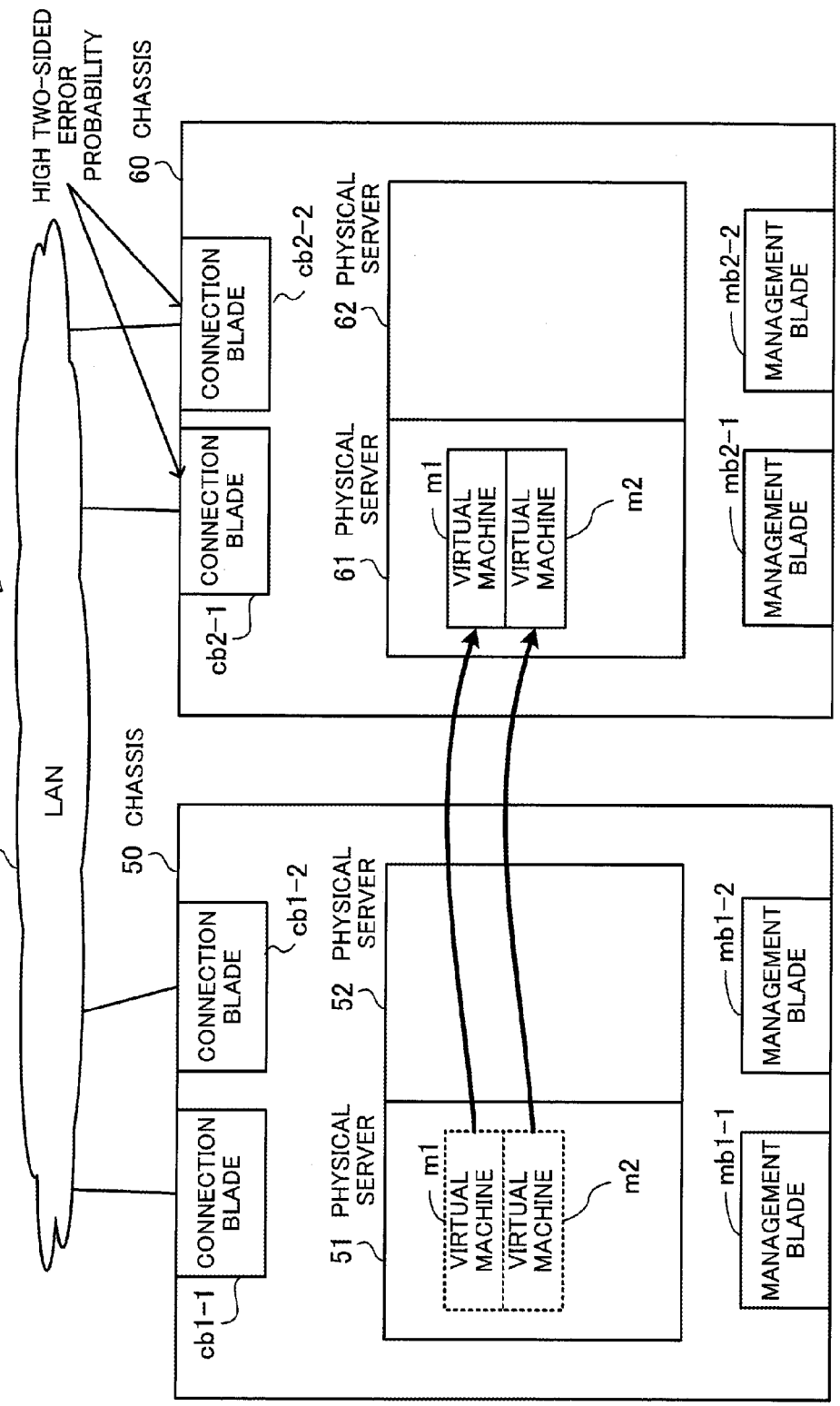
Figure 7:
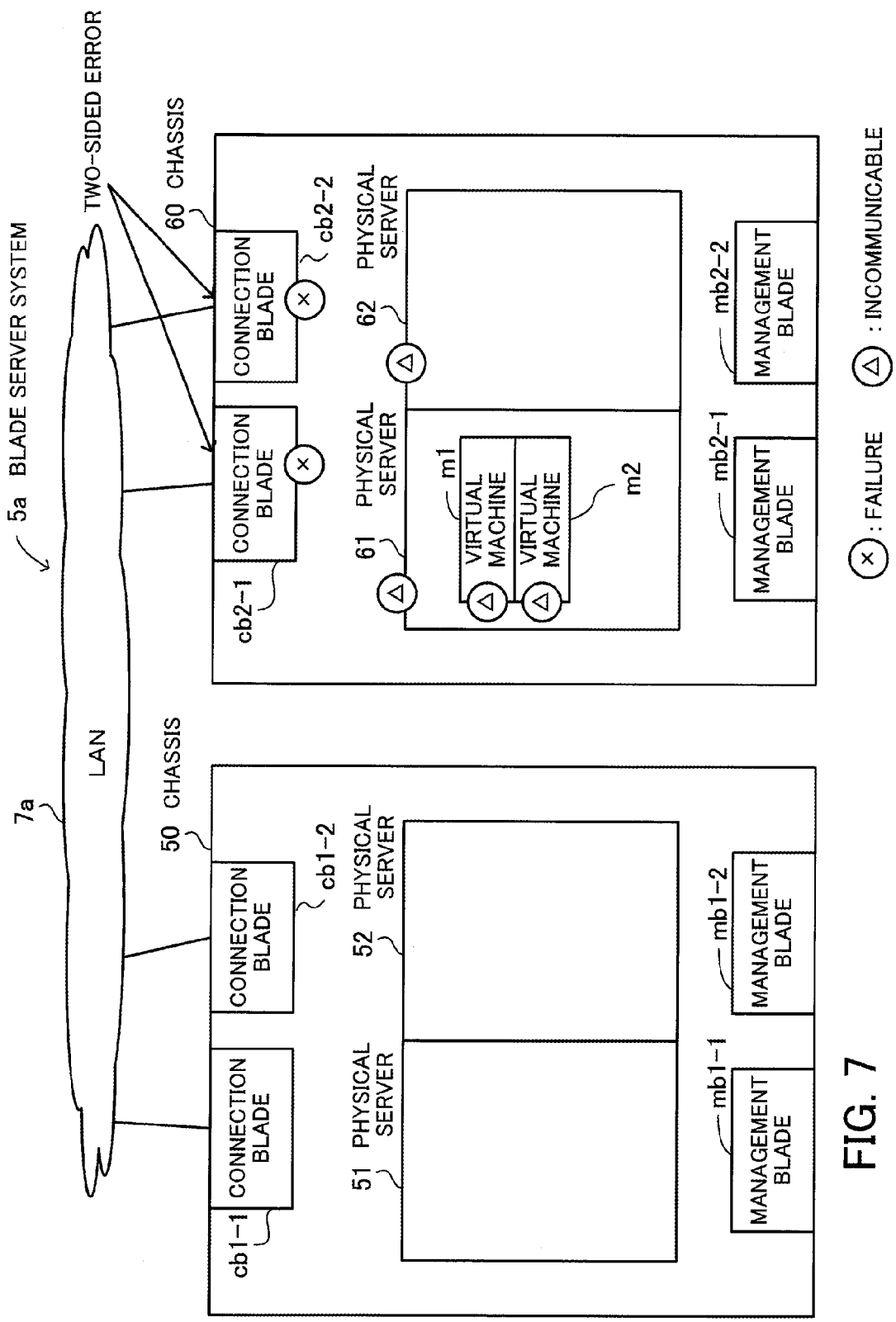

FIGS. 6 and 7 illustrate a problem that may arise at the time of placing virtual machines. In FIG. 6, it is assumed that a two-sided error is likely to occur in the connection blades cb2-1 and cb2-2 in the chassis 60. It is also assumed that the virtual machines m1 and m2 are running on the physical server 51 in the chassis 50 and the CPU load and memory load continue to be high in the physical server 51.

In this case, in conventional control of virtual machine placement, if the load on the physical server 61 in the chassis 60 is lower than that on the physical server 51 and the physical server 61 has more free processing capacity than the physical server 51, the virtual machines m1 and m2 would be migrated to the physical server 61 in the chassis 60 for load balancing.

However, a two-sided error is likely to occur in the connection blades cb2-1 and cb2-2. If a two-sided error actually occurs, as illustrated in FIG. 7, communications of the physical servers 61 and 62 in the chassis 60 with outside are disconnected.

If this happens, communications of the virtual machines m1 and m2, which have been migrated from the physical server 51 to the physical server 61, with outside are disconnected and become unusable. This causes a system failure and thus reduces system availability and also reliability.

The proposed technique has been made in view of the foregoing, and is intended to provide an information processing apparatus, server management method, and server management program that are capable of performing optimal virtual machine placement by appropriately recognizing error probabilities of chassis which are locations for virtual machines, thereby making it possible to improve system availability and reliability.

Figure 8:
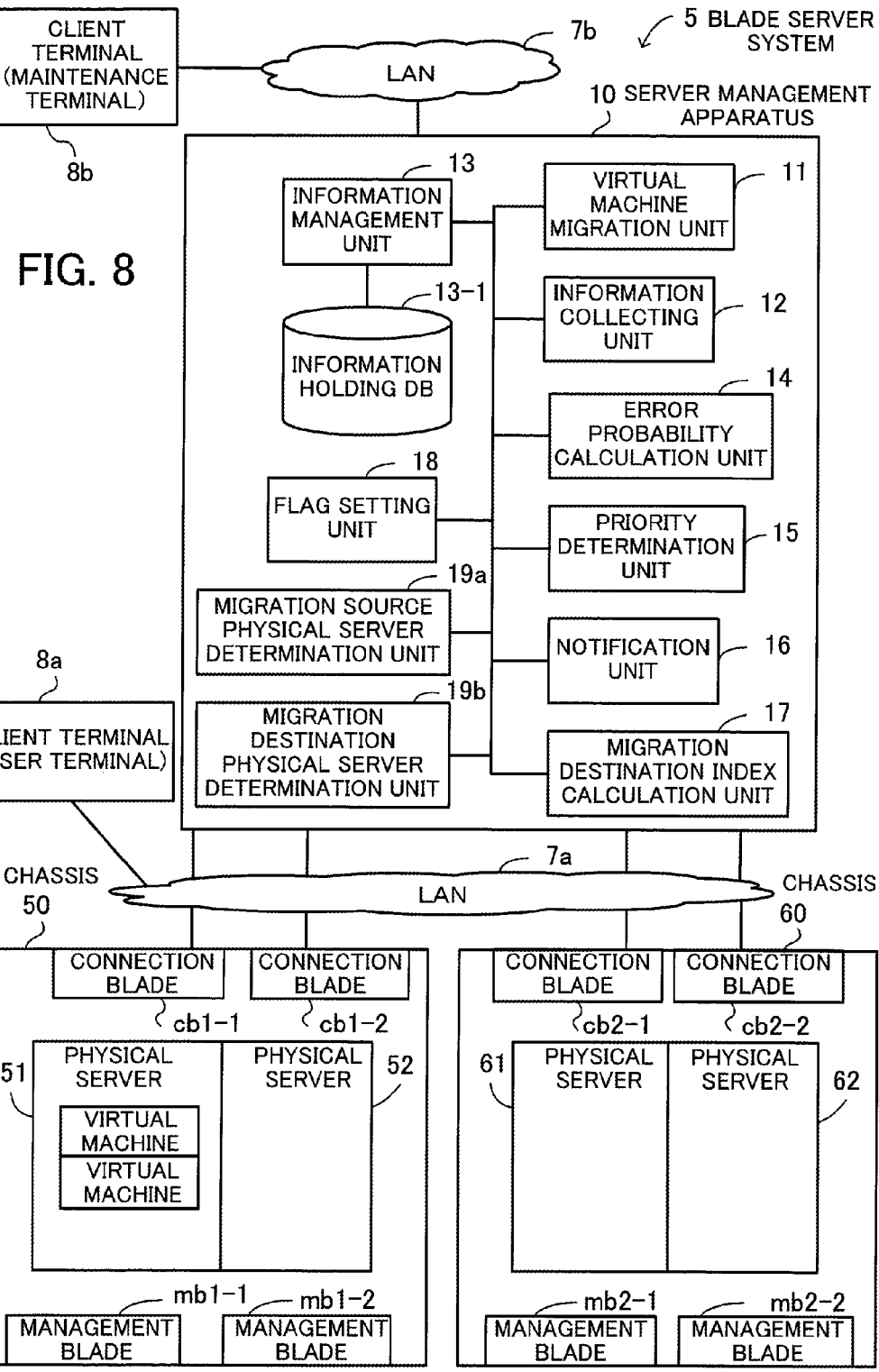
FIG. 8 illustrates an example of a configuration of a blade server system.

FIG. 8 illustrates an example of a configuration of a blade server system. A blade server system 5 includes chassis 50 and 60, LANs 7a and 7b, a server management apparatus (management server) 10, and client terminals 8a and 8b.

Connection blades cb1-1 and cb1-2 of the chassis 50 and connection blades cb2-1 and cb2-2 of the chassis 60 connect to the LAN 7a. The server management apparatus 10 connects to the LANs 7a and 7b.

In addition, the client terminals 8a and 8b connect to the LANs 7a and 7b, respectively. The client terminal 8a is a user terminal that performs processes with virtual machines, whereas the client terminal 8b is a maintenance terminal that performs system management. In this connection, the chassis 50 and 60 have the same constitutional elements as illustrated in FIG. 2, and therefore the same reference numerals are applied and the explanation thereof is omitted.

The server management apparatus 10 covers the functions of the information processing apparatus 1 of FIG. 1. The server management apparatus 10 defines a two-sided error probability indicating how likely a two-sided error is to occur, for both pairs of management blades and connection blades having a redundant configuration in a chassis. The server management apparatus 10 periodically collects information from the management blades and connection blades, calculates two-sided error probabilities, and then perform optimal virtual machine placement (live migration) on the basis of the two-sided error probabilities.

The server management apparatus 10 includes a virtual machine migration unit 11, information collecting unit 12, information management unit 13, information holding database (DB) 13-1, error probability calculation unit 14, priority determination unit 15, notification unit 16, migration destination index calculation unit 17, flag setting unit 18, migration source physical server determination unit 19a, and migration destination physical server determination unit 19b.

The functions of the instruction unit 1a illustrated in FIG. 1 are implemented by the virtual machine migration unit 11, migration source physical server determination unit 19a, and migration destination physical server determination unit 19b. The functions of the calculation unit 1b illustrated in FIG. 1 are implemented by the information collecting unit 12 and error probability calculation unit 14.

In this connection, each function of the virtual machine migration unit 11, information collecting unit 12, information management unit 13, error probability calculation unit 14, priority determination unit 15, notification unit 16, migration destination index calculation unit 17, flag setting unit 18, migration source physical server determination unit 19a, and migration destination physical server determination unit 19b is implemented by executing a program (server management program) on the server management apparatus 10. This server management program starts its processing according to an instruction from the client terminal 8b.

The virtual machine migration unit 11 performs a migration process for migrating a virtual machine from the physical server of the chassis where the virtual machine is currently located to a physical server of another chassis. The information collecting unit 12 monitors the operating statuses of the equipment and physical servers of the chassis 50 and 60. For example, the information collecting unit 12 periodically accesses the connection blades cb1-1, cb1-2, cb2-1, and cb2-2 in the chassis 50 and 60 to collect predetermined information indicating the operating statuses. In this connection, such information may be collected using Simple Network Management Protocol (SNMP) or another communication protocol.

The information management unit 13 registers and manages various kinds of table information in the information holding database 13-1. The information holding database 13-1 holds various tables, and registers and holds information collected by the information collecting unit 12, values calculated by the error probability calculation unit 14, etc. in corresponding tables.

The error probability calculation unit 14 calculates error probabilities based on collected information. The priority determination unit 15 determines, based on the error probabilities, migration destination chassis priority that indicates which chassis is to be prioritized for placing a virtual machine.

The notification unit 16 makes a notification of a result of processing relating to the migration of a virtual machine. In this connection, usually, a user who does tasks with virtual machines does not need to know which physical servers the virtual machines are located on, but only a system administrator needs to recognize the locations of the virtual machines.

Therefore, the notification unit 16 makes a notification of the processing result to the client terminal 8b. The client terminal 8b then displays the processing result or messages in the Graphical User Interface (GUI).

The migration destination index calculation unit 17 calculates a migration destination index of each physical server that may become the migration destination of a virtual machine. The flag setting unit 18 carries out a threshold-based determination for a calculated error probability, and sets a flag when the error probability exceeds a threshold.

The migration source physical server determination unit 19a determines a physical server where a virtual machine to be migrated is located. The migration destination physical server determination unit 19b determines a physical server that is a new location of the virtual machine.

Figure 9:
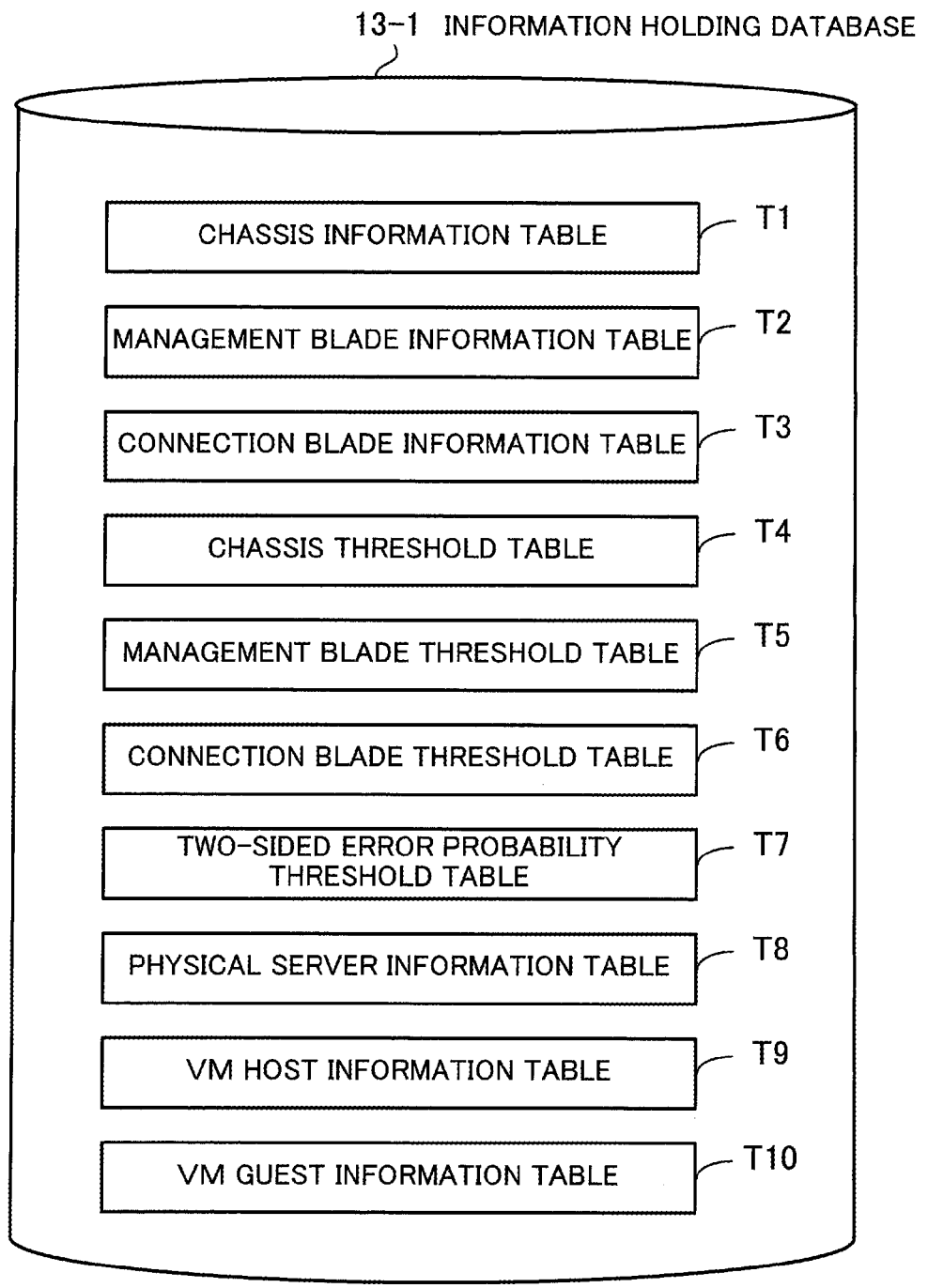
FIG. 9 illustrates exemplary tables held in an information holding database.

FIG. 9 illustrates exemplary tables held in an information holding database. The information holding database 13-1 includes a chassis information table T1, management blade information table T2, connection blade information table T3, chassis threshold table T4, and management blade threshold table T5.

The information holding database 13-1 further includes a connection blade threshold table T6, two-sided error probability threshold table T7, physical server information table T8, VM host information table T9, and VM guest information table T10. A specific example of structures of these tables will be described later with reference to FIGS. 11 to 20.

The following describes an error probability calculation process that is performed by the error probability calculation unit 14. The calculation of an error probability roughly includes calculation of a two-sided error probability with respect to management blades, calculation of a two-sided error probability with respect to connection blades, and calculation of a two-sided error probability with respect to a chassis. In this connection, basically, a two-sided error probability is calculated in the same way for both of the management blades and connection blades. Therefore, the following flow describes how to calculate a management blade two-sided error probability.

Figure 10:
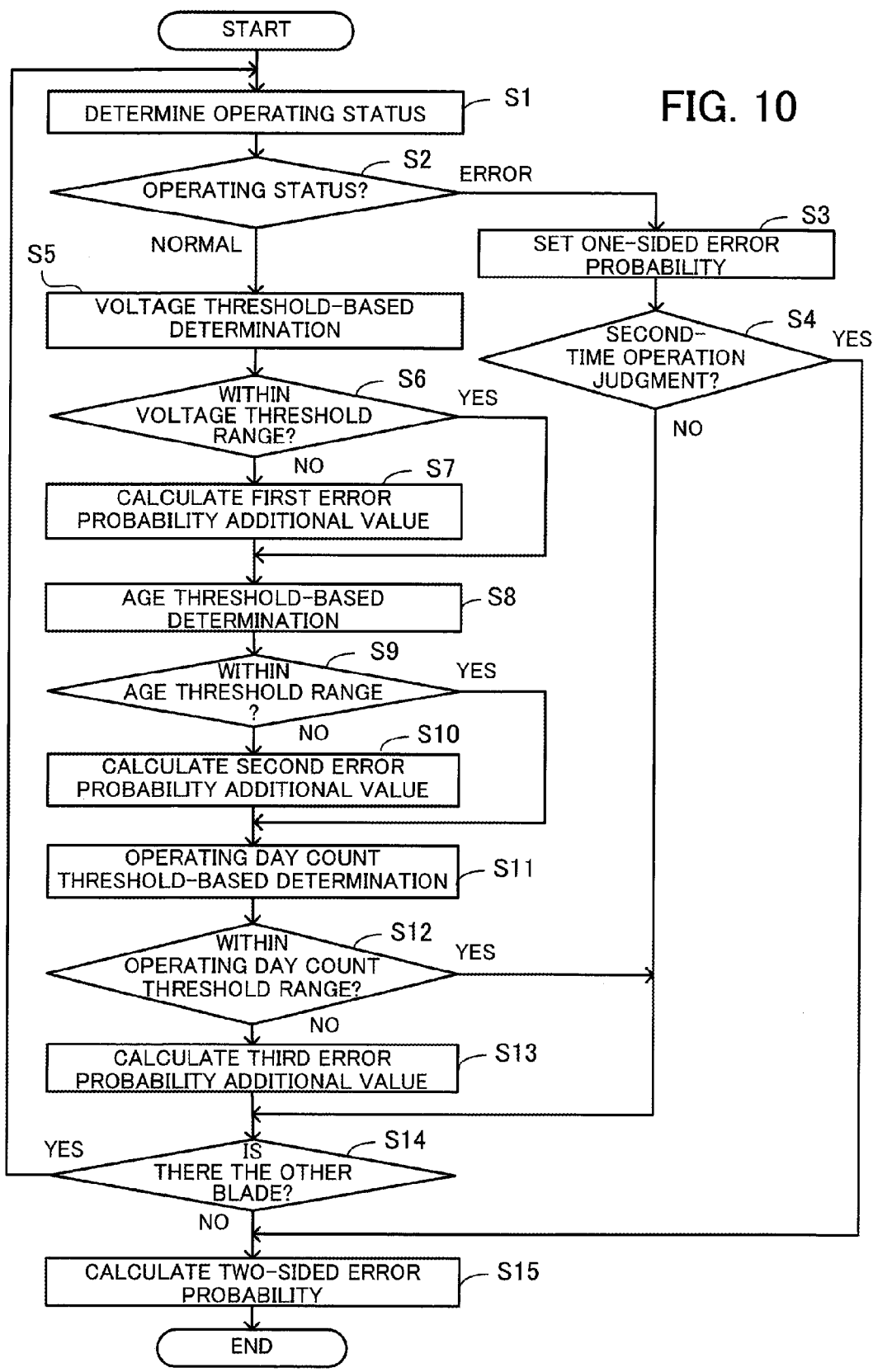
FIG. 10 is a flowchart illustrating how to calculate a management blade two-sided error probability.

FIG. 10 is a flowchart illustrating how to calculate a management blade two-sided error probability.

(S1) The error probability calculation unit 14 determines the operating status of one management blade.

(S2) When the error probability calculation unit 14 recognizes the operating status of the management blade as an error, the process proceeds to step S3. When the operating status is recognized as normal, on the other hand, the process proceeds to step S5.

(S3) The error probability calculation unit 14 sets a one-sided error probability to a value indicating that the operating status of the management blade in question is an error. For example, the one-side error probability is set to 100.

(S4) The error probability calculation unit 14 determines whether it is the second time the operation judgment has been performed. When the error probability calculation unit 14 recognizes that it is the first time (this is the operation judgment for the first management blade), the process proceeds to step S14. When it is the second time (this is the operation judgment for the second management blade), on the other hand, the process proceeds to step S15.

(S5) The error probability calculation unit 14 performs a threshold-based determination with respect to the operating voltage of the management blade.

(S6) When the operating voltage of the management blade is lower than the minimum threshold or exceeds the maximum threshold, the error probability calculation unit 14 recognizes that the operating voltage is out of the voltage threshold range, and the process proceeds to step S7. When the operating voltage of the management blade is greater than or equal to the minimum threshold or does not exceed the maximum threshold, the error probability calculation unit 14 recognizes that the operating voltage is within the voltage threshold range, and the process proceeds to step S8.

(S7) The error probability calculation unit 14 calculates a first error probability additional value. For example, the first error probability additional value is calculated by (first error probability additional value)=100÷(the number of threshold-based determinations to be performed). The number of threshold-based determinations to be performed is the number of kinds of threshold-based determinations. In this example, three kinds of threshold-based determinations are performed: voltage threshold-based determination, age threshold-based determination, and operating day count threshold-based determination. Therefore, the number of threshold-based determinations to be performed is 3.

(S8) The error probability calculation unit 14 performs a threshold-based determination with respect to the age of the management blade (the number of years elapsed from production). For example, the age of the management blade is calculated by subtracting the production date and time set at the production time of the management blade from the current date and time.

(S9) When the error probability calculation unit 14 recognizes that the age of the management blade exceeds a threshold, the process proceeds to step S10. When the age of the management blade does not exceed the threshold, on the other hand, the process proceeds to step S11.

(S10) The error probability calculation unit 14 calculates a second error probability additional value. For example, similarly to the first error probability additional value, the second error probability additional value is calculated by (second error probability additional value)=100÷(the number of threshold-based determinations to be performed) (in this example, the number of threshold-based determinations to be performed is 3).

(S11) The error probability calculation unit 14 performs a threshold-based determination with respect to the operating day count of the management blade.

(S12) When the error probability calculation unit 14 recognizes that the number of operating days of the management blade exceeds a threshold, the process proceeds to step S13. When the number of operating days of the management blade does not exceed the threshold, on the other hand, the process proceeds to step S14.

(S13) The error probability calculation unit 14 calculates a third error probability additional value. For example, similarly to the first error probability additional value, the third error probability additional value is calculated by (third error probability additional value)=100÷(the number of threshold-based determinations to be performed) (In this example, the number of threshold-based determinations to be performed is 3).

(S14) The error probability calculation unit 14 determines whether or not there is the other management blade for which the error probability calculation process is not performed, i.e., whether or not there is the other paired management blade for which the error probability calculation process is not performed. If such a management blade exists, the process proceeds back to step S1. Otherwise, the process proceeds to step S15.

(S15) The error probability calculation unit 14 calculates a two-sided error probability of the management blades. For example, the two-sided error probability is calculated by (two-sided error probability)=((one-sided error probability)+(one-sided error probability))÷2. The error probability calculation process as described above makes it possible to calculate a two-sided error probability efficiently.

When the operating status of a management blade is recognized as an error, the one-sided error probability is a value that is set at step S3. If the operating status of a management blade is recognized as normal, but any of the voltage threshold-based determination, age threshold-based determination, and operating day count threshold-based determination produces a result that a value is out of the threshold range, a sum of calculated error probability additional values out of the first to third error probability additional values is taken as the one-sided error probability.

For example, if values are out of the corresponding threshold ranges in all of the voltage threshold-based determination, age threshold-based determination, and operating day count threshold-based determination with respect to one management blade, a sum of the three (first to third) error probability additional values is set as a one-sided error probability. At this time, the one-sided error probability is calculated by (one-sided error probability)=(first error probability additional value)+(second error probability additional value)+(third error probability additional value).

In this connection, two management blades are installed in a single chassis and have a redundant configuration. Therefore, the operation judgment is performed twice at above step S4. On the other hand, n pairs of connection blades, i.e., 2n connection blades are installed in a single chassis and have a redundant configuration.

Therefore, in the case where the process of FIG. 10 is performed for the connection blades, the operation judgment is performed 2n times at step S4. The other steps of the error probability calculation process are the same as those performed for the management blades.

The following describes how to calculate a chassis two-sided error probability. The error probability calculation unit 14 calculates a chassis two-sided error probability by (chassis two-sided error probability)=((chassis age error probability)+(unit error probability))÷2.

It is assumed here that the chassis age error probability is set to a value when the age of a chassis exceeds a threshold. For example, the chassis age is calculated by subtracting the production date and time set at the production time of a chassis from the current date and time. For example, this chassis age error probability is set to 100 when the chassis age exceeds the threshold, and set to 0 when the chassis age does not exceed the threshold.

The unit error probability is set to a value based on the management blade two-sided error probability and the connection blade two-sided error probability. More specifically, assuming that n pairs of connection blades are installed in a single chassis, the error probability calculation unit 14 calculates a unit error probability by (unit error probability) {(management blade two-sided error probability)+(connection blade two-sided error probability #1)+(connection blade two-sided error probability #2)+ . . . +(connection blade two-sided error probability #n)}÷(1+n).

The following describes a priority determination process that is performed by the priority determination unit 15. The priority determination unit 15 sorts the chassis two-sided error probabilities in ascending order from lowest to highest, to determine migration destination chassis priority for a virtual machine.

A low chassis two-sided error probability indicates a low possibility of power interruption or communication disconnection, so a chassis with a low chassis two-sided error probability may be considered as a secure location for a virtual machine. Therefore, a chassis with a lower chassis two-sided error probability is given a higher migration destination chassis priority. In the case where there are some chassis having the same chassis two-sided error probability, the priority determination unit 15 performs the sorting in ascending order of numbers given as chassis name, for example.

The following describes a migration destination index calculation process that is performed by the migration destination index calculation unit 17. The migration destination index calculation unit 17 calculates a migration destination index in terms of the CPUs and memories on a physical server, from CPU consumption ranking and memory consumption ranking.

More specifically, the migration destination index calculation unit 17 calculates a migration destination index by (migration destination index)=(CPU consumption ranking)+ (memory consumption ranking).

In this connection, a lower rank value in the CPU consumption ranking indicates more CPU consumption, and a higher rank value in the CPU consumption ranking indicates less CPU consumption. Similarly, a lower rank value in the memory consumption ranking indicates more memory consumption, and a higher rank value in the memory consumption ranking indicates less memory consumption. Therefore, a higher migration destination index is obtained with less CPU consumption and less memory consumption.

The following describes each table held in the information holding database 13-1. FIG. 11 illustrates an exemplary structure of a chassis information table. The chassis information table T1 includes the following fields: Identifier (ID), Chassis Name, Pair ID, Age (chassis age), Chassis Two-sided Error Probability, and Migration Destination Chassis Priority.

A chassis name, pair ID, and age are previously registered in the chassis information table T1 by a maintainer with the client terminal 8b. A chassis two-sided error probability and migration destination chassis priority are values that are calculated and determined by the error probability calculation unit 14 and priority determination unit 15. A pair ID in this table is an ID given to a pair of chassis, and therefore the same ID is given to paired chassis.

FIG. 12 illustrates an exemplary structure of a management blade information table. The management blade information table T2 includes the following fields: ID, Chassis ID, Management Blade Name, Pair ID, Operating Status, Voltage, Age, Operating Day Count, and Two-sided Error Probability (management blade two-sided error probability).

A chassis ID, management blade name, pair ID, operating status, voltage, age, and operating day count are information that is collected by the information collecting unit 12 from an active management blade. A two-sided error probability is a value that is calculated by the error probability calculation unit 14.

In this connection, the management blade in active mode recognizes the information (operating status, voltage, age, and operating day count) on the management blade in standby mode as well. Therefore, the information collecting unit 12 makes an inquiry to the management blade in active mode to collect information on both of the paired management blades. A pair ID in this table is an ID given to a pair of management blades. Therefore, the same pair ID is given to the paired management blades.

FIG. 13 illustrates an exemplary structure of a connection blade information table. The connection blade information table T3 includes the following fields: ID, Chassis ID, Slot ID, Connection Blade Name, Pair ID, Operating Status, Voltage, Age, Operating Day Count, and Two-sided Error Probability (connection blade two-sided error probability).

A management blade recognizes the chassis ID, slot ID, connection blade name, and pair ID with respect to connection blades as well. Therefore, the information collecting unit 12 is able to collect these pieces of information on the connection blades when collecting information from the management blade.

An operating status, voltage, age, and operating day count are information that is collected by the information collecting unit 12 by accessing a connection blade. A two-sided error probability is a value that is calculated by the error probability calculation unit 14.

In addition, a pair ID in this table is an ID given to a pair of connection blades, and therefore the same ID is given to the paired connection blades.

With respect to the operating day count that is registered in the above management blade information table T2 and connection blade information table T3, the value is cleared to zero when a management blade and connection blade stop their execution.

FIG. 14 illustrates an exemplary structure of a chassis threshold table. The chassis threshold table T4 contains information on aging degradation of chassis, and includes the following fields: ID, Item, Minimum Threshold, and Maximum Threshold. An item indicates what is used in a threshold-based determination for chassis. Referring to this example of FIG. 14, a threshold-based determination is performed for chassis in terms of age.

FIG. 15 illustrates an exemplary structure of a management blade threshold table. The management blade threshold table T5 includes the following fields: ID, Item, Minimum Threshold, and Maximum Threshold. Referring to this example, threshold-based determinations for management blades are performed in terms of voltage, age, and operating day count. In this connection, the threshold-based determinations for management blades are a process of steps S5 to S13 of FIG. 10 that is performed with respect to management blades.

FIG. 16 illustrates an exemplary structure of a connection blade threshold table. The connection blade threshold table T6 includes the following fields: ID, Item, Minimum Threshold, and Maximum Threshold. Referring to this example, threshold-based determinations for connection blades are performed in terms of voltage, age, and operating day count. In this connection, the threshold-based determinations for connection blades are a process of steps S5 to S13 of FIG. 10 that is performed with respect to connection blades.

FIG. 17 illustrates an exemplary structure of a two-sided error probability threshold table. The two-sided error probability threshold table T7 registers threshold information on management blade two-sided error probability, connection blade two-sided error probability, and chassis two-sided error probability, and includes the following fields: ID, Type, Pair ID, and Maximum Threshold.

Referring to FIG. 17, this table has a record with a type of management blade and a maximum threshold of 50. This record indicates that a first threshold for management blade two-sided error probability is 50. The table has another record with a type of connection blade and a maximum threshold of 50. This record indicates that a second threshold for connection blade two-sided error probability is 50. The table has another record with a type of chassis and a maximum threshold of 50. This record indicates that a third threshold for chassis two-sided error probability is 50. The threshold-based determinations based on the first to third thresholds will be described later with reference to FIG. 22.

FIG. 18 illustrates an exemplary structure of a physical server information table. The physical server information table T8 includes the following fields: ID, Chassis ID, CPU (MHz), Memory (MB), and IP address. Each value in the CPU and Memory fields indicates a loaded amount. An IP address is the IP address of a chassis.

FIG. 19 illustrates an exemplary structure of a VM host information table. The VM host information table T9 contains information on the current operating statuses of physical servers that are migration destinations for virtual machines, and includes the following fields: ID, Physical Server ID, CPU Consumption (MHz), CPU Consumption Ranking, Memory Consumption (MB), Memory Consumption Ranking, Migration Destination Index, and Flag (threshold-exceeded flag).

A physical server ID, CPU consumption (MHz), and memory consumption (MB) are information that is collected by the information collecting unit 12 by accessing a physical server that is a VM host. A CPU consumption ranking, memory consumption ranking, and migration destination index are values that are obtained by the migration destination index calculation unit 17. As a flag, a truth-value set by the flag setting unit 18 is registered.

FIG. 20 illustrates an exemplary structure of a VM guest information table. The VM guest information table T10 contains information on virtual machines to be migrated, and includes the following fields: ID, VM Host ID, CPU Consumption (MHz), and Memory Consumption (GB). A VM host ID, CPU consumption (MHz), and memory consumption (GB) are information that is collected by the information collecting unit 12 by accessing a physical server (migration source VM host) where a virtual machine to be migrated is located.

Figure 21:
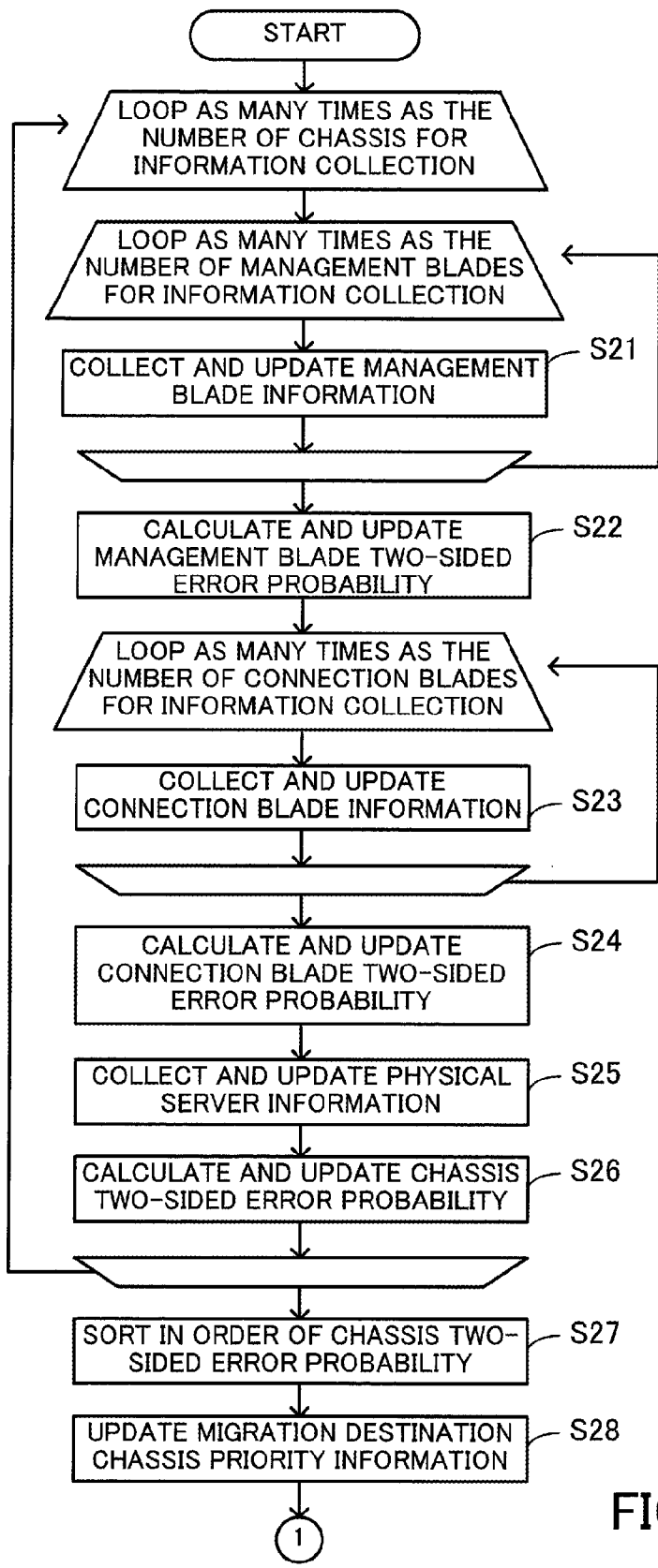
FIGS. 21 and 22 are flowcharts illustrating how a server management apparatus operates.
Figure 22:
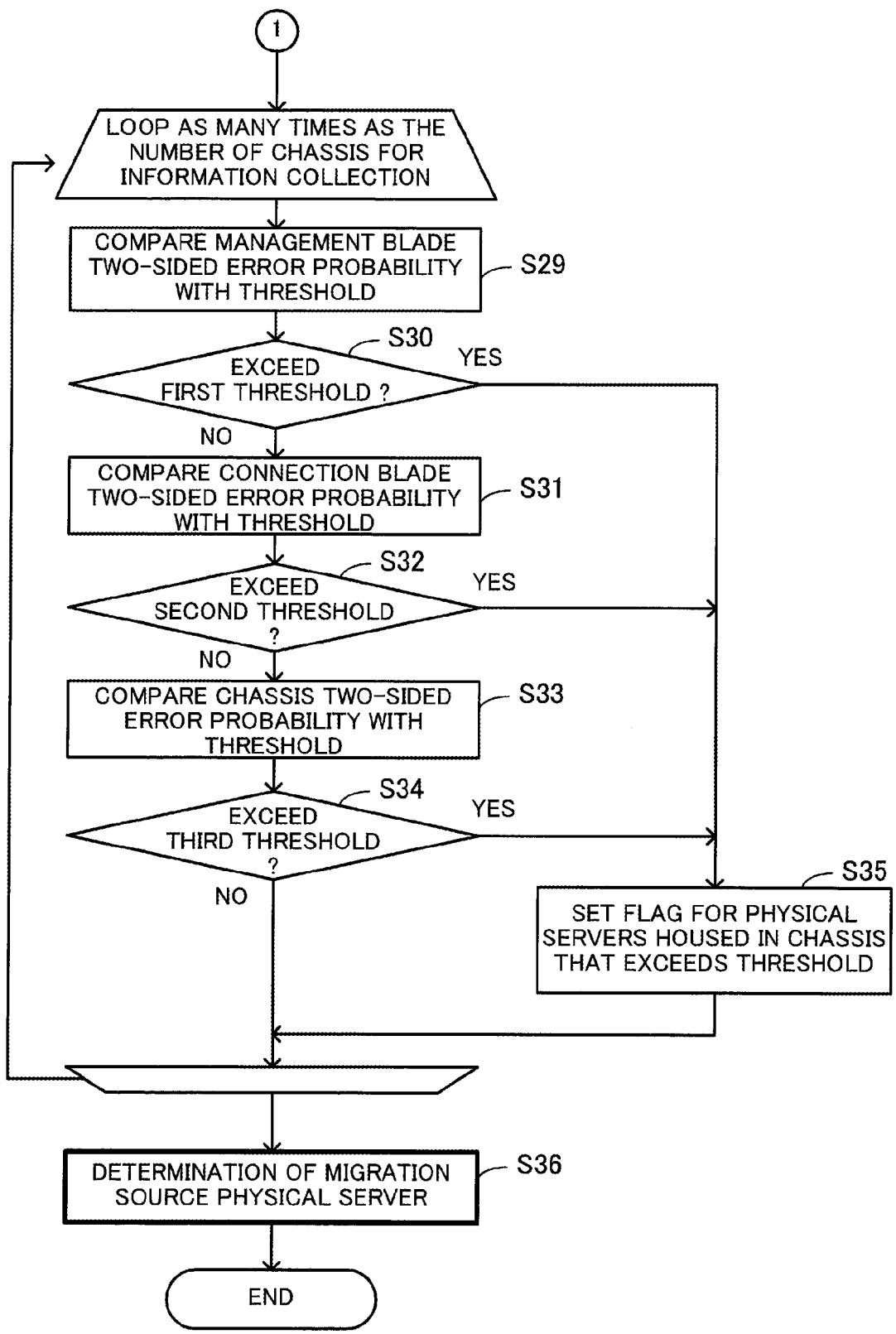

The following describes how the server management apparatus 10 operates, with reference to flowcharts. FIGS. 21 and 22 are flowcharts illustrating how a server management apparatus operates. A process of steps S21 to S36 is performed at fixed intervals as one entire operation of the server management apparatus 10.

(S21) The information collecting unit 12 collects information on management blades. The information management unit 13 updates the management blade information table T2 on the basis of the collected information. This step S21 is executed as many times as the number of management blades installed in a single chassis.

(S22) The error probability calculation unit 14 calculates a management blade two-sided error probability. For example, in the case of the chassis 50, an error probability indicating how likely both of the management blades mb1-1 and mb1-2 are to malfunction is calculated.

(S23) The information collecting unit 12 collects information on connection blades. The information management unit 13 updates the connection blade information table T3 on the basis of the collected information. This step S23 is executed as many times as the number of connection blades installed in the single chassis.

(S24) The error probability calculation unit 14 calculates a connection blade two-sided error probability. For example, in the case of the chassis 50, an error probability indicating how likely both of the connection blades cb1-1 and cb1-2 are to malfunction is calculated.

(S25) The information collecting unit 12 collects physical server information managed by a management blade. The information management unit 13 updates the physical server information table T8. The management blade obtains and manages information on physical servers housed in the same chassis as the management blade.

(S26) The error probability calculation unit 14 calculates a chassis two-sided error probability.

(S27) The priority determination unit 15 performs sorting in order of chassis two-sided error probability to determine migration destination chassis priority.

(S28) The priority determination unit 15 updates the migration destination chassis priority.

(S29) The flag setting unit 18 compares the management blade two-sided error probability with the first threshold.

(S30) When the flag setting unit 18 recognizes that the management blade two-sided error probability does not exceed the first threshold, the process proceeds to step S31. When the management blade two-sided error probability exceeds the first threshold, on the other hand, the process proceeds to step S35.

(S31) The flag setting unit 18 compares the connection blade two-sided error probability with the second threshold.

(S32) When the flag setting unit 18 recognizes that the connection blade two-sided error probability does not exceed the second threshold, the process proceeds to step S33. When the connection blade two-sided error probability exceeds the second threshold, on the other hand, the process proceeds to step S35.

(S33) The flag setting unit 18 compares the chassis two-sided error probability with the third threshold.

(S34) When the flag setting unit 18 recognizes that the chassis two-sided error probability does not exceed the third threshold, the process proceeds to step S36. When the chassis two-sided error probability exceeds the third threshold, on the other hand, the process proceeds to step S35.

(S35) When at least one of the first to third thresholds is exceeded, the flag setting unit 35 sets a flag for physical servers housed in the chassis which exceeds the threshold. A process of steps S29 to S35 is performed as many times as the number of chassis.

(S36) The migration source physical server determination unit 19a determines a migration source physical server for virtual machine migration.

As described above, each chassis is judged based on the condition that a management blade two-sided error probability exceeds the first threshold, the condition that a connection blade two-sided error probability exceeds the second threshold, and the condition that a chassis two-sided error probability exceeds the third threshold. Then, a flag is set for physical servers housed in a chassis that satisfies any one of these conditions. Such a flag setting process makes it possible to efficiently detect physical servers housed in a chassis that has an increased two-sided error probability.

Figure 23:
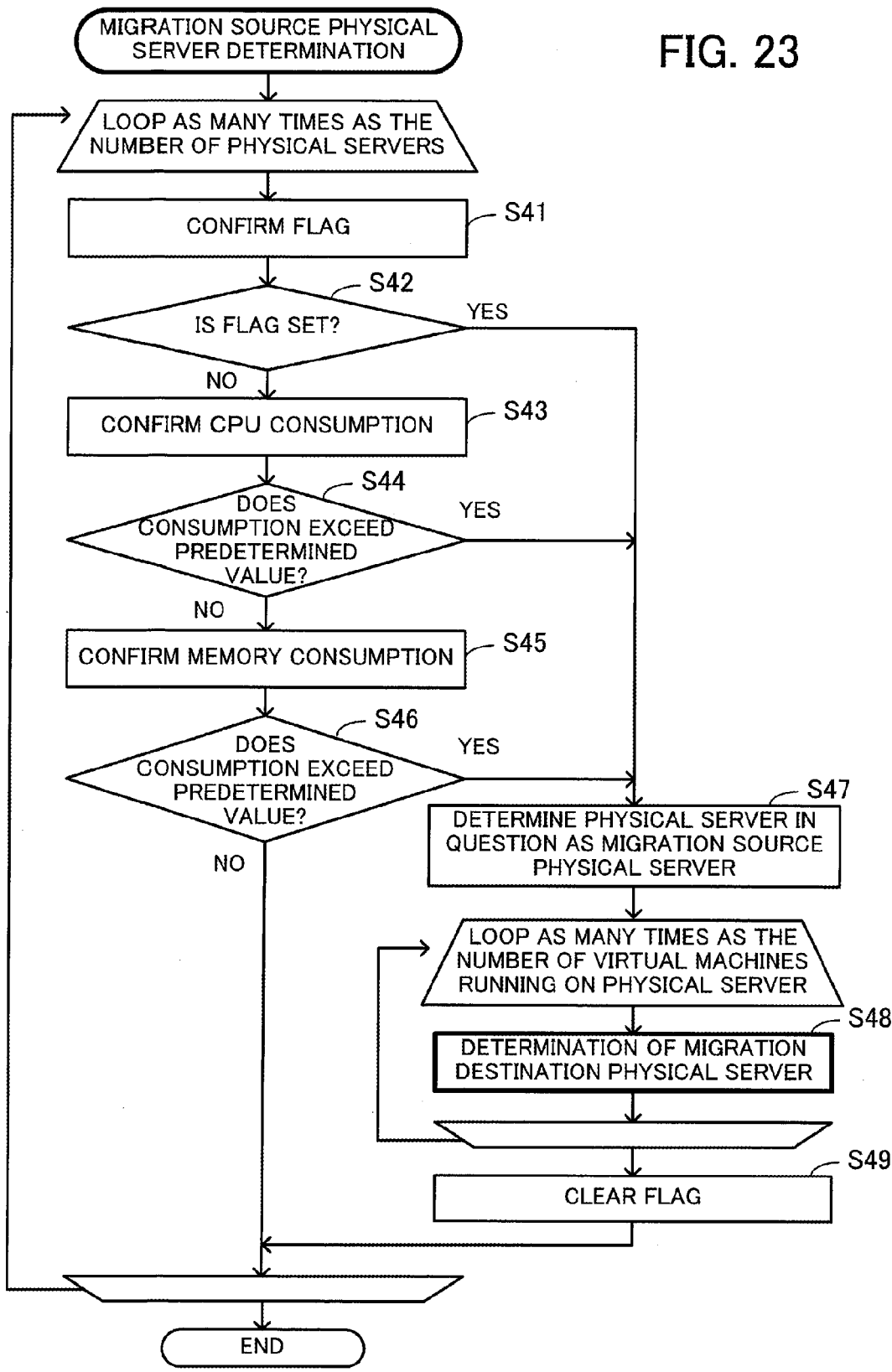
FIG. 23 is a flowchart illustrating a migration source physical server determination process.

The following describes how to determine a migration source physical server at step S36, with reference to a flowchart. FIG. 23 is a flowchart illustrating a migration source physical server determination process. A process of steps S41 to S48 is performed as many times as the number of physical servers housed in a single chassis.

(S41) The migration source physical server determination unit 19a confirms the status of a flag.

(S42) The migration source physical server determination unit 19a determines whether a flag indicating that a threshold is exceeded, described earlier at step S35, is set for a physical server or not. The process proceeds to step S43 when a flag is not set (flag truth-value=false), and proceeds to step S47 when a flag is set (flag truth-value=true).

(S43) The migration source physical server determination unit 19a confirms the CPU consumption of the physical server in question.

(S44) When the migration source physical server determination unit 19a recognizes that the CPU consumption within a predetermined period does not exceed a predetermined value (load threshold), the process proceeds to step S45. When the CPU consumption within the predetermined period exceeds the predetermined value, on the other hand, the process proceeds to step S47.

(S45) The migration source physical server determination unit 19a confirms the memory consumption of the physical server in question.

(S46) When the migration source physical server determination unit 19a recognizes that the memory consumption within the predetermined period does not exceed a predetermined value (load threshold), this migration source physical server determination process is completed. When the memory consumption within the predetermined period exceeds the predetermined value, on the other hand, the process proceeds to step S47.

(S47) The migration source physical server determination unit 19a determines the physical server in question as a migration source physical server.

(S48) The migration destination physical server determination unit 19b performs a migration destination physical server determination process. Step S48 is executed as many times as the number of virtual machines running on a single physical server.

(S49) The flag setting unit 18 clears a flag set for the physical server in question. The above process makes it possible to efficiently select a physical server where virtual machines to be migrated are located.

Figure 24:
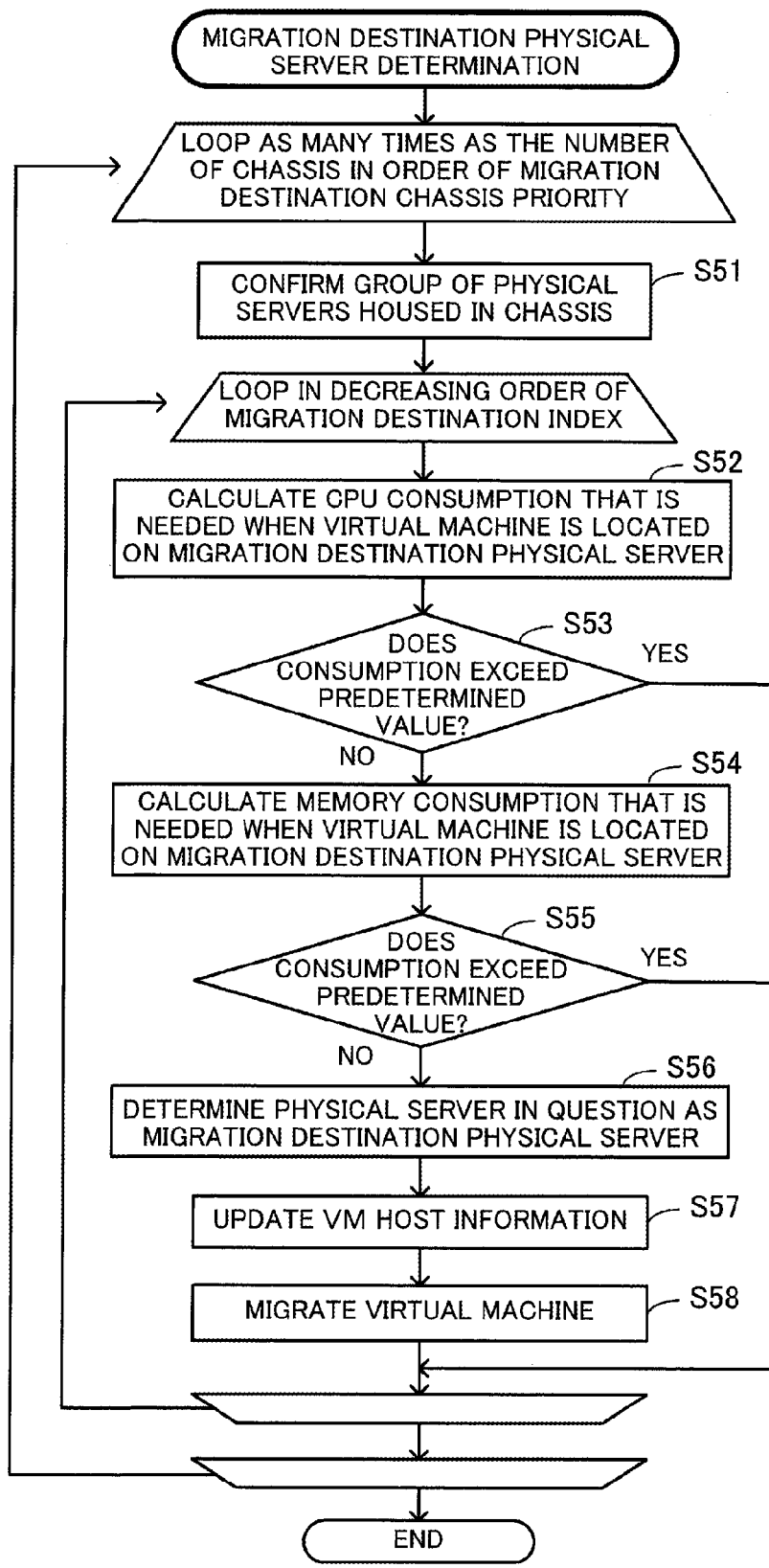
FIG. 24 is a flowchart illustrating a migration destination physical server determination process.

The following describes how to determine a migration destination physical server at step S48, with reference to a flowchart. FIG. 24 is a flowchart illustrating a migration destination physical server determination process. In this connection, a process of steps S51 to S58 is performed as many times as the number of chassis in decreasing order of migration destination chassis priority.

(S51) The migration destination physical server determination unit 19b confirms a group of physical servers housed in a chassis.

(S52) The migration destination physical server determination unit 19b calculates a CPU consumption that is needed when a virtual machine is located on a migration destination physical server. More specifically, the migration destination physical server determination unit 19b calculates the CPU consumption by adding the CPU consumption of the migration destination physical server (migration destination VM host) and the CPU consumption of the virtual machine to be migrated (VM guest to be migrated).

(S53) When the migration destination physical server determination unit 19b recognizes that the CPU consumption calculated at step S52 does not exceed a predetermined value (load threshold), the process proceeds to step S54. When the CPU consumption exceeds the predetermined value, on the other hand, the migration destination physical server determination unit 19b recognizes that the physical server in question is not to be a migration destination physical server, and so completes this process.

(S54) The migration destination physical server determination unit 19b calculates a memory consumption that is needed when the virtual machine is located on the migration destination physical server. More specifically, the migration destination physical server determination unit 19b calculates the memory consumption by adding the memory consumption of the migration destination physical server (migration destination VM host) and the memory consumption of the virtual machine to be migrated (VM guest to be migrated).

(S55) When the migration destination physical server determination unit 19b recognizes that the memory consumption calculated at step S54 does not exceed a predetermined value (load threshold), the process proceeds to step S56. When the memory consumption exceeds the predetermined value, on the other hand, the migration destination physical server determination unit 19b recognizes that the physical server in question is not to be a migration destination physical server, and so completes this process.

(S56) The migration destination physical server determination unit 19b determines the physical server in question as a migration destination physical server.

(S57) The information management unit 13 updates the VM host information table T9.

(S58) The virtual machine migration unit 11 migrates the virtual machine currently running on the migration source physical server determined by the migration source physical server determination unit 19a to the migration destination physical server determined by the migration destination physical server determination unit 19b, thereby changing the location of the virtual machine.

The process of steps S52 to S58 is performed in decreasing order of migration destination index. A higher migration destination index value indicates a lower load on a physical destination physical server, whereas a lower migration destination index value indicates a higher load on a migration destination physical server. Therefore, in decreasing order of migration destination index, the process is looped starting with a migration destination physical server with the lowest load.

The above processes make it possible to efficiently select, as the location of a virtual machine, a physical server with the lowest load in a chassis with a plurality of equipment error probabilities (management blade two-sided error probability, connection blade two-sided error probability, and chassis two-sided error probability) being low.

Figure 25:
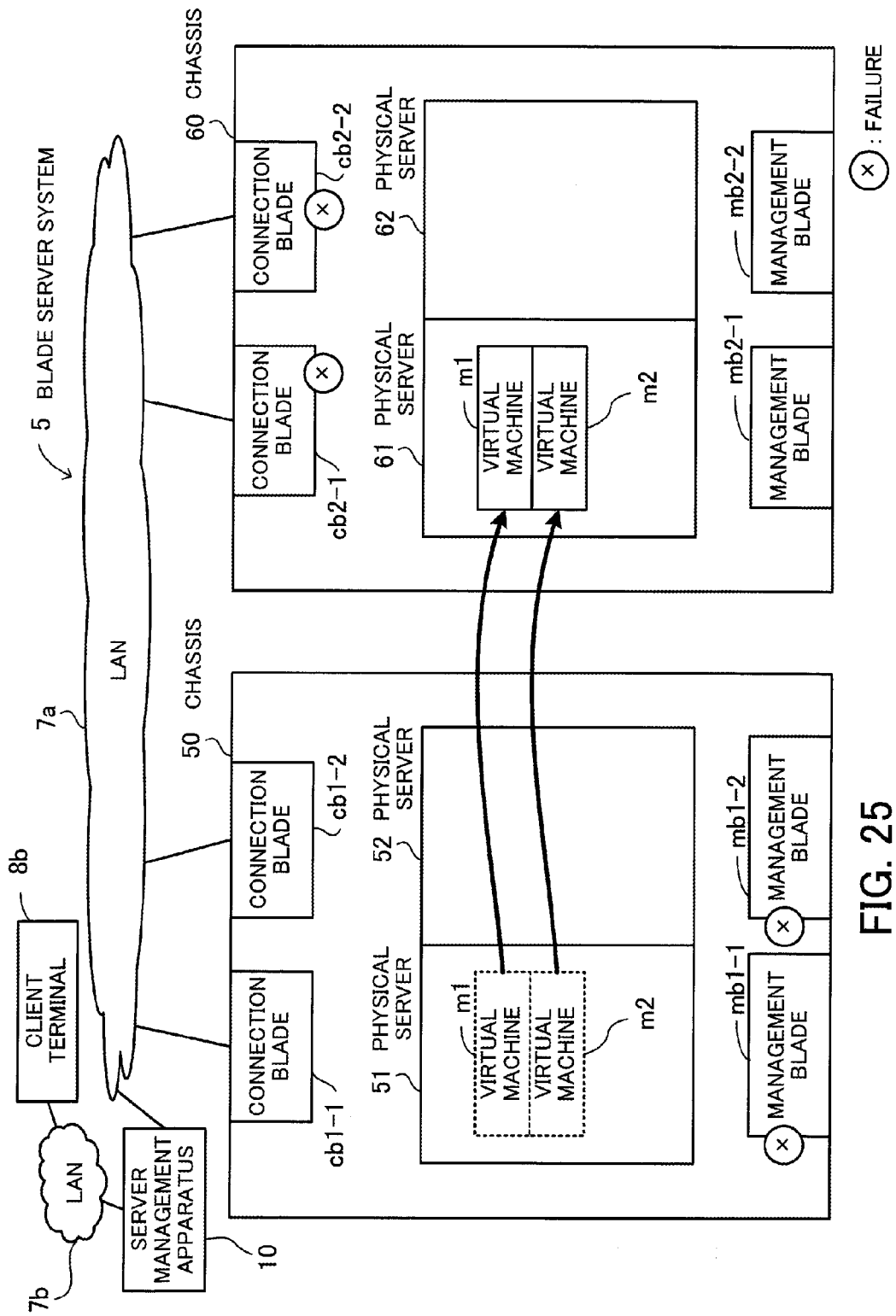
FIG. 25 illustrates migration of virtual machines due to detection of a failure in management blades.

The following describes how to manage virtual machine placement. FIG. 25 illustrates migration of virtual machines due to detection of a failure in management blades.

Assume that a failure occurs in the management blades mb1-1 and mb1-2 in the chassis 50 in the blade server system 5. In this case, when the server management apparatus 10 recognizes that the two-sided error probability of the management blades mb1-1 and mb1-2 has exceeded a threshold, the server management apparatus 10 migrates the virtual machines m1 and m2 to the chassis 60. Referring to FIG. 25, the virtual machines m1 and m2 are migrated to the physical server 61 of the chassis 60.

Figure 26:
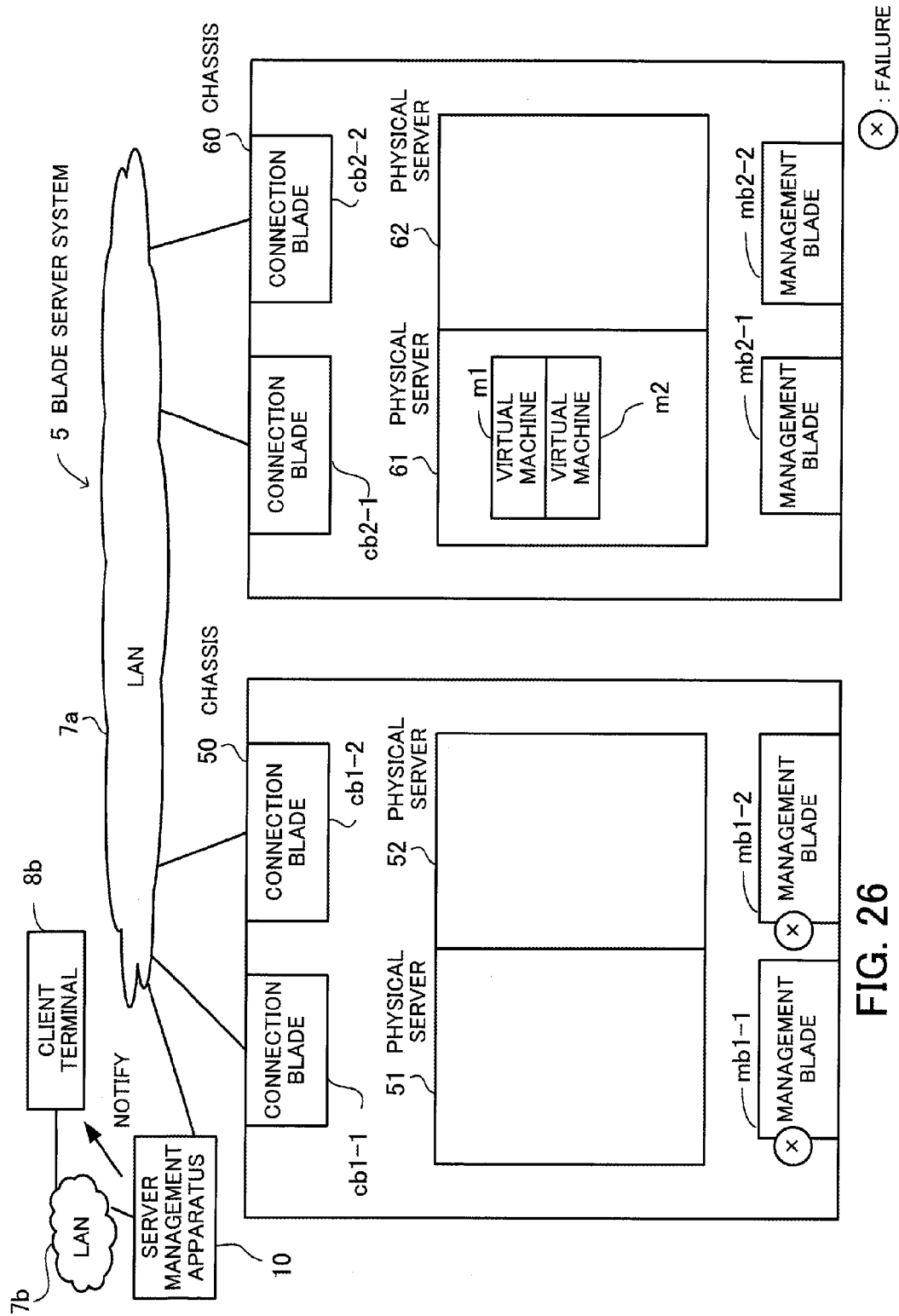
FIG. 26 illustrates a notification of migration of virtual machines to a maintainer.

FIG. 26 illustrates a notification of migration of virtual machines to a maintainer. The server management apparatus 10 sends the client terminal 8b a notification indicating that the virtual machines m1 and m2 were migrated from the physical server 51 of the chassis 50 to the physical server 61 of the chassis 60.

Figure 27:
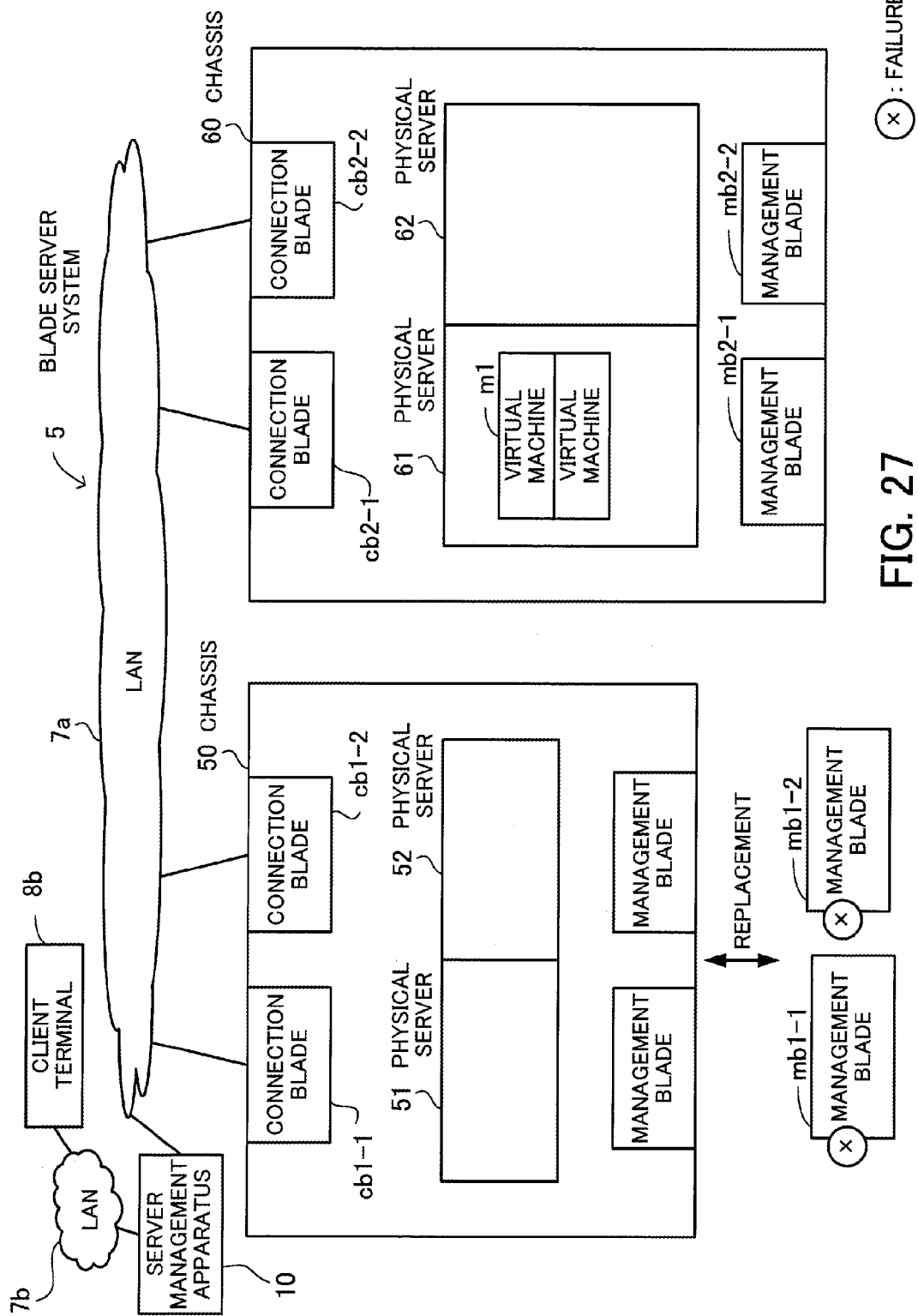
FIG. 27 illustrates replacement of faulty management blades.

FIG. 27 illustrates replacement of faulty management blades. The management blades mb1-1 and mb1-2 that have a two-sided error in the chassis 50 are replaced with new management blades by a maintainer.

Figure 28:
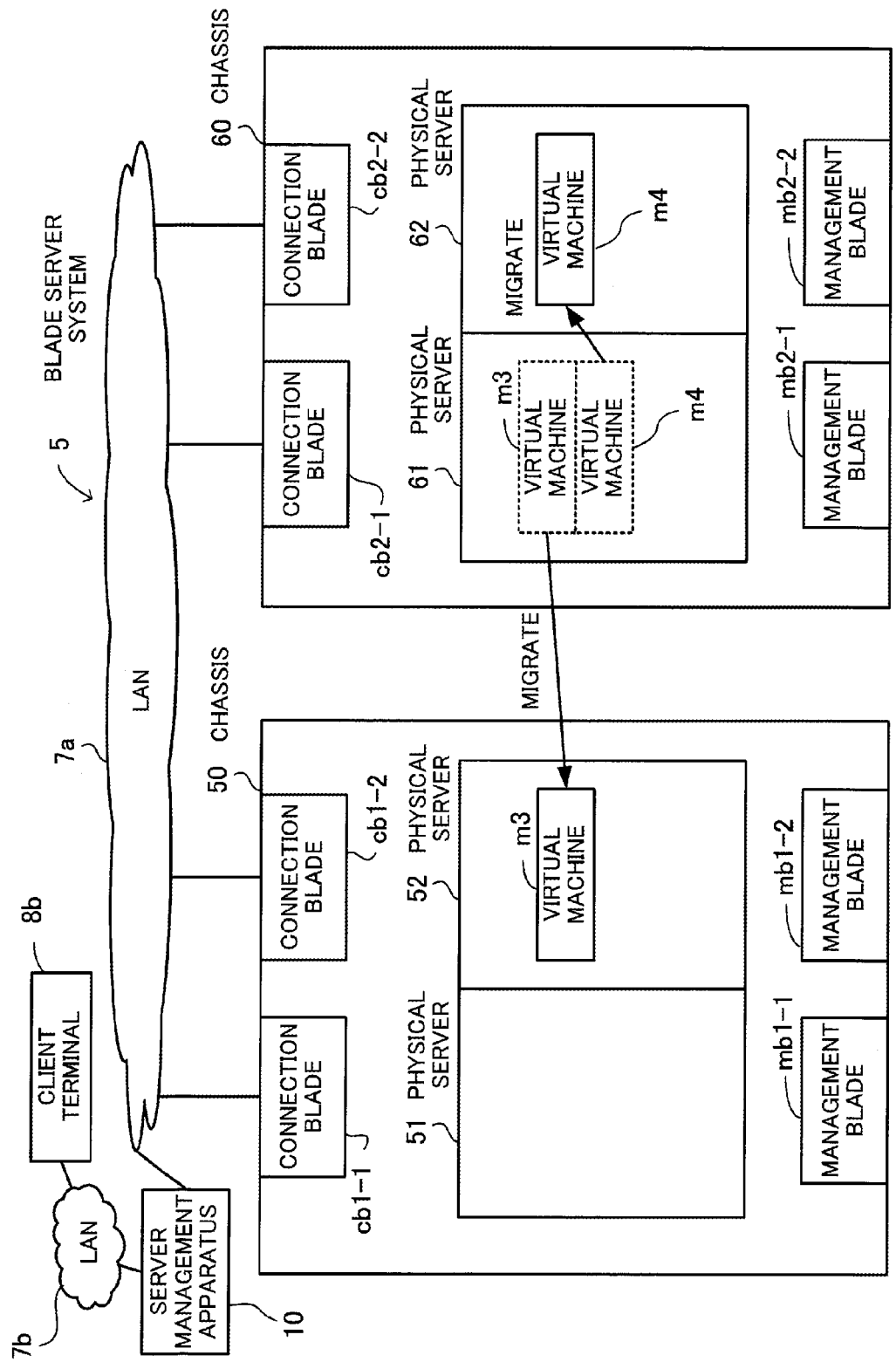
FIG. 28 illustrating load balancing through virtual machine placement.

FIG. 28 illustrates load balancing through virtual machine placement. It is assumed that, in the case where virtual machines m3 and m4 are located on the physical server 61 in the chassis 60, the load on the physical server 61 is higher than that on the physical server 52 in the chassis 50, and is higher than that on the physical server 62 in the chassis 60. In this case, the virtual machine m3 is migrated to the physical server 52, and the virtual machine m4 is migrated to the physical server 62, thereby performing load balancing.

Figure 29:
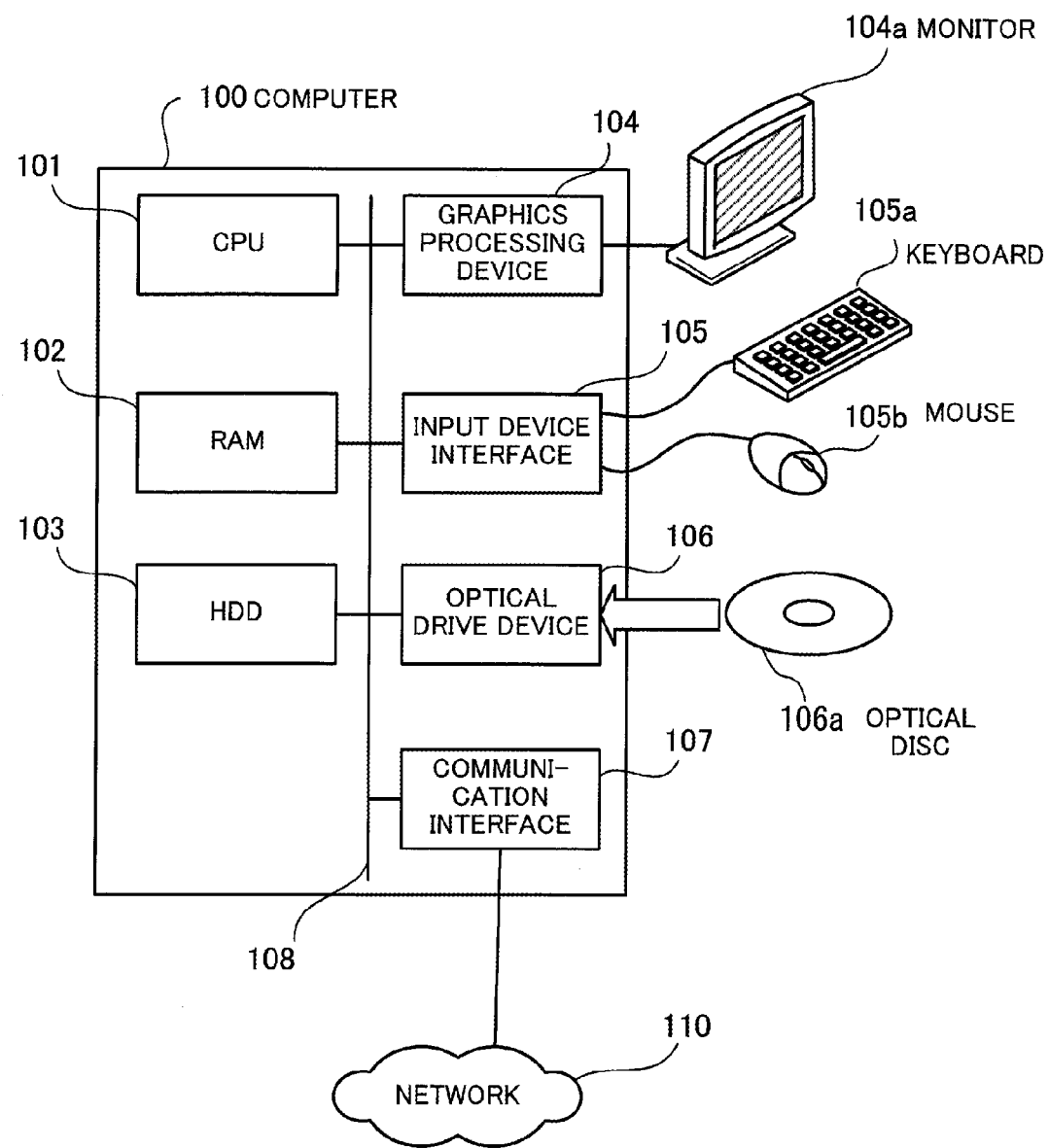
FIG. 29 illustrates an exemplary hardware configuration of a computer to be used in an embodiment.

The above processing functions are realized by a computer. FIG. 29 illustrates an exemplary hardware configuration of a computer to be used in the embodiment. A computer 100 is entirely controlled by a CPU 101. A Random Access Memory (RAM) 102 and a plurality of peripheral devices are connected to the CPU 101 via a bus 108.

The RAM 102 is used as a primary storage device of the computer 100. The RAM 102 temporarily stores at least part of Operating System (OS) programs and application programs to be executed by the CPU 101. The RAM 102 also stores various data to be used while the CPU 101 operates.

The peripheral devices connected to the bus 108 include a hard disk drive (HDD) 103, graphics processing device 104, input device interface 105, optical drive device 106, and communication interface 107.

The HDD 103 magnetically writes and reads data on a built-in disk. The HDD 103 is used as a secondary storage device of the computer 100. The HDD 103 stores the OS programs, application programs, and various data. In this connection, a flash memory or another kind of semiconductor storage device may be used as a secondary storage device.

A monitor 104a is connected to the graphics processing device 104. The graphics processing device 104 displays images on the screen of the monitor 104a under the control of the CPU 101. As the monitor 104a, a display device using Cathode Ray Tube (CRT) or a liquid crystal display device may be used.

A keyboard 105a and mouse 105b are connected to the input device interface 105. The input device interface 105 transfers signals from the keyboard 105a and mouse 105b to the CPU 101. The mouse 105b is one example of pointing devices, and another kind of pointing device such as a touch panel, tablet, touchpad, or trackball may be used.

The optical drive device 106 reads data from an optical disc 106a with leaser beams. The optical disc 106a is a portable recording medium on which data is recorded so as to be read with reflection of light. As the optical disc 106a, a Digital Versatile Disc (DVD), DVD-RAM, Compact Disc Read Only Memory (CD-ROM), CD-R (Readable), CD-RW (ReWritable), etc. may be used.

The communication interface 107 is connected to a network 110. The communication interface 107 performs data communications with other computers or communication apparatuses via the network 110.

The processing functions of the first and second embodiments are realized with the above hardware configuration. In addition, to realize the above processing functions of the first and second embodiments with a computer, a program is provided, which describes the processing functions of the information processing apparatus 1 or server management apparatus 10.

A computer realizes the above processing functions by executing the program. The program describing the intended processes may be recorded on a computer-readable recording medium. Computer-readable recording media include magnetic recording devices, optical discs, magneto-optical recording media, semiconductor memories, etc. The magnetic recording devices include Hard Disk Drives (HDDs), Flexible Disks (FDs), Magnetic Tapes, etc. The optical discs include DVDs, DVD-RAMs, CD-ROMs, CD-RWs, etc. The magneto-optical recording media include Magneto-Optical disks (MOs), etc. In this connection, the recording media for recoding programs do not embrace transitory propagating signals per se.

To distribute the program, portable recording media, such as DVDs and CD-ROMs, on which the program is recorded, may be put on sale. Alternatively, the program may be stored in the storage device of a server computer and may be transferred from the server computer to other computers through a network.

A computer which is to execute the program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

In addition, the above-described processing functions may also be implemented wholly or partly by using a Digital Signal Processor (DSP), Application-Specific Integrated Circuit (ASIC), Programmable Logic Device (PLD), or other electronic circuits.

As described above, this technique does not determine the location of a virtual machine based only on the loads on the CPUs and memories of physical servers, but appropriately recognizes the error probabilities of locations for the virtual machine, and places the virtual machine preferentially on a location having a low error probability while avoiding using locations having high error probabilities. This makes it possible to prevent a chassis from entirely malfunctioning and to improve system availability and reliability.

According to one aspect, it is possible to improve system availability.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising a processor configured to perform a procedure comprising:
    monitoring an operating status of equipment that is installed in each of a plurality of chassis each housing one or a plurality of physical servers and that is used for operations of the physical servers, and calculating an equipment error probability of each of the plurality of chassis, the equipment error probability indicating how likely the physical servers housed in said each chassis are to fail to provide service due to an error in the equipment of said each chassis; and
    instructing the physical servers to start to provide or stop providing the service, based on calculated equipment error probabilities of the plurality of chassis;
    wherein the processor calculates a probability of power interruption in said each chassis as the equipment error probability; and
    wherein:
    a plurality of management units in a redundant configuration is installed in each of the plurality of chassis for managing power supply to the physical servers, and
    the processor calculates, as the probability of power interruption, a probability that an error occurs in all of the plurality of management units in said each chassis and the power supply to the physical servers in said each chassis is interrupted.

2. The information processing apparatus according to claim 1, wherein:
    the processor calculates the probability of power interruption based on one-sided error probabilities of the plurality of management units, wherein
    each of the one-sided error probabilities is calculated in such a manner that:

when an operating status of a management unit is recognized as an error, the processor sets a predetermined value as the one-sided error probability of the management unit; and when the operating status of the management unit is recognized as normal, the processor obtains one or more of operating voltage, age, and operating day count of the management unit,
calculates a first error probability additional value when the operating voltage is out of a voltage threshold range,
calculates a second error probability additional value when the age is out of an age threshold range;
calculates a third error probability additional value when the operating day count is out of an operating day count threshold range, and
calculates a sum of the first, second, and third error probability additional values as the one-sided error probability of the management unit.

3. The information processing apparatus according to claim 1, wherein
the processor instructs the physical servers housed in a chassis whose equipment error probability exceeds a predetermined threshold or a physical server whose load exceeds a load threshold to stop providing the service, and
instructs a physical server whose load is lowest out of physical servers housed in a chassis whose equipment error probability does not exceed the predetermined threshold to start to provide the service.

4. The information processing apparatus according to claim 1, wherein:
the physical servers each provide the service with a virtual machine; and
the processor instructs migration of the virtual machine from a physical server housed in a chassis whose equipment error probability exceeds a predetermined threshold to a physical server housed in a chassis whose equipment error probability does not exceed the predetermined threshold.

5. An information processing apparatus comprising a processor configured to perform a procedure comprising:
monitoring an operating status of equipment that is installed in each of a plurality of chassis each housing one or a plurality of physical servers and that is used for operations of the physical servers, and calculating an equipment error probability of each of the plurality of chassis, the equipment error probability indicating how likely the physical servers housed in said each chassis are to fail to provide service due to an error in the equipment of said each chassis; and
instructing the physical servers to start to provide or stop providing the service, based on calculated equipment error probabilities of the plurality of chassis;
wherein the processor calculates a probability of communication disconnection of said each chassis as the equipment error probability of said each chassis; and
wherein:
a plurality of connecting units in a redundant configuration is installed in each of the plurality of chassis for connecting the physical servers to a network, and
the processor calculates, as the probability of communication disconnection, a probability that an error occurs in all of the plurality of connecting units in said each chassis and communications of the physicals servers in said each chassis are disconnected.

6. The information processing apparatus according to claim 5, wherein:
the processor calculates the probability of connection disconnection based on one-sided error probabilities of the plurality of connecting units, wherein
each of the one-sided error probabilities is calculated in such a manner that:
when an operating status of a connecting unit is recognized as an error, the processor sets a predetermined value as the one-sided error probability of the connecting unit; and
when the operating status of the connecting unit is recognized as normal, the processor obtains one or more of operating voltage, age, and operation day count of the connecting unit,
calculates a first error probability additional value when the operating voltage is out of a voltage threshold range,
calculates a second error probability additional value when the age is out of an age threshold range,
calculates a third error probability additional value when the operating day count is out of an operating day count threshold, and
calculates a sum of the first, second, and third error probability additional values as the one-sided error probability of the connecting unit.

7. An information processing apparatus comprising a processor configured to perform a procedure comprising:
monitoring an operating status of equipment that is installed in each of a plurality of chassis each housing one or a plurality of physical servers and that is used for operations of the physical servers, and calculating an equipment error probability of each of the plurality of chassis, the equipment error probability indicating how likely the physical servers housed in said each chassis are to fail to provide service due to an error in the equipment of said each chassis; and
instructing the physical servers to start to provide or stop providing the service, based on calculated equipment error probabilities of the plurality of chassis;
wherein the processor instructs the physical servers housed in a chassis whose equipment error probability exceeds a predetermined threshold to stop providing the service, and instructs the physical servers housed in a chassis whose equipment error probability does not exceed the predetermined threshold to start to provide the service; and
wherein the processor uses a probability of power interruption of a chassis as a first equipment error probability, a probability of communication disconnection of the chassis as a second equipment error probability, and an equipment error probability calculated based on a value indicating a number of years elapsed from production of the chassis, the first equipment error probability, and the second equipment error probability as a third equipment error probability, and
instructs the physical servers housed in a chassis that satisfies one or more of first to three conditions to stop providing the service, the first condition being that the first equipment error probability exceeds a first threshold as a result of comparing the first equipment error probability with the first threshold, the second condition being that the second equipment error probability exceeds a second threshold as a result of comparing the second equipment error probability with the second threshold, the third condition being that the third equipment error probability exceeds a third threshold as a result of comparing the third equipment error probability with the third threshold.

8. A server management method comprising:

monitoring, by an information processing apparatus, an operating status of equipment that is installed in each of a plurality of chassis each housing one or a plurality of physical servers and that is used for operations of the physical servers, and calculating an equipment error probability of each of the plurality of chassis, the equipment error probability indicating how likely the physical servers housed in said each chassis are to fail to provide service due to an error in the equipment of said each chassis; and instructing, by the information processing apparatus, the physical servers to start to provide or stop providing the service, based on calculated equipment error probabilities of the plurality of chassis;

wherein the calculating of the equipment error probability includes calculating a probability of power interruption in said each chassis as the equipment error probability; and wherein:

a plurality of management units in a redundant configuration is installed in each of the plurality of chassis for managing power supply to the physical servers, and the calculating of the probability of power interruption includes calculating, as the probability of power interruption, a probability that an error occurs in all of the plurality of management units in said each chassis and the power supply to the physical servers in said each chassis is interrupted.

9. A computer-readable storage medium storing a computer program, the computer program causing an information processing apparatus to perform a procedure comprising:

monitoring an operating status of equipment that is installed in each of a plurality of chassis each housing one or a plurality of physical servers and that is used for operations of the physical servers, and calculating an equipment error probability of each of the plurality of chassis, the equipment error probability indicating how likely the physical servers housed in said each chassis are to fail to provide service due to an error in the equipment of said each chassis; and instructing the physical servers to start to provide or stop providing the service, based on calculated equipment error probabilities of the plurality of chassis;

wherein the calculating of the equipment error probability includes calculating a probability of power interruption in said each chassis as the equipment error probability; and wherein:

a plurality of management units in a redundant configuration is installed in each of the plurality of chassis for managing power supply to the physical servers, and the calculating of the probability of power interruption includes calculating, as the probability of power interruption, a probability that an error occurs in all of the plurality of management units in said each chassis and the power supply to the physical servers in said each chassis is interrupted.

* * * * *